United States Patent
Lei et al.

(10) Patent No.: US 10,924,167 B2
(45) Date of Patent: Feb. 16, 2021

(54) FORWARD COMPATIBLE DESIGN FOR NON-ORTHOGONAL UE SIGNATURE SEQUENCES

(71) Applicant: QUALCOMM Incorporated, San Diego, CA (US)

(72) Inventors: Jing Lei, San Diego, CA (US); Renqiu Wang, San Diego, CA (US); Seyong Park, San Diego, CA (US); Naga Bhushan, San Diego, CA (US); Jay Kumar Sundararajan, San Diego, CA (US); Jing Jiang, San Diego, CA (US); Yi Huang, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 16/261,166

(22) Filed: Jan. 29, 2019

(65) Prior Publication Data
US 2019/0238196 A1    Aug. 1, 2019

Related U.S. Application Data

(60) Provisional application No. 62/625,296, filed on Feb. 1, 2018.

(51) Int. Cl.
*H04B 7/0456*    (2017.01)
*H04J 13/00*    (2011.01)
(Continued)

(52) U.S. Cl.
CPC ............. *H04B 7/0456* (2013.01); *H04B 1/69* (2013.01); *H04J 11/004* (2013.01);
(Continued)

(58) Field of Classification Search
CPC .............. H04W 72/10; H04L 27/2607; H04L 27/2613; H04J 13/10; H04J 13/0062; H04J 11/004; H04B 1/69
See application file for complete search history.

(56) References Cited

U.S. PATENT DOCUMENTS

2015/0049713 A1*    2/2015    Lan .................. H04L 9/0875
                                                                370/329

OTHER PUBLICATIONS

Heath R.W., et al., "Grassmannian Signatures for CDMA Systems", GLOBECOM'03. 2003—IEEE Global Telecommunications Conference, Conference Proceedings, San Francisco, CA, Dec. 1-5, 2003, [IEEE Global Telecommunications Conference], New York, NY, IEEE, US, vol. 3, Dec. 1, 2003 (Dec. 1, 2003 ), pp. 1553-1557, XP010677555, DOI:10.1109/GLOCOM.2003.1258498, ISBN: 978-0-7803-7974-9, Sections II. and III.

(Continued)

*Primary Examiner* — Gbemileke J Onamuti
(74) *Attorney, Agent, or Firm* — Holland & Hart LLP

(57)    ABSTRACT

Methods, systems, and devices for wireless communications are described. A wireless device such as a user equipment (UE) may identify a codebook matrix having a number of rows equal to a first number and a number of columns equal to a second number, the first number equal to a number of UEs supported for communication with a base station, and the second number equal to a sequence length of a set of UE specific signature sequences, where the rows of the codebook matrix comprise a Welch bound equality (WBE) achieving vector set. The UE may identify a UE specific signature sequence based at least in part on a mapping between an identifier associated with the UE to one or more rows of the codebook matrix, and communicate with the base station based at least in part on the UE specific signature sequence.

30 Claims, 16 Drawing Sheets

(51) Int. Cl.
    *H04L 27/26*    (2006.01)
    *H04B 1/69*     (2011.01)
    *H04W 72/10*    (2009.01)
    *H04J 11/00*    (2006.01)
    *H04J 13/10*    (2011.01)
(52) U.S. Cl.
    CPC ...... *H04J 13/0062* (2013.01); *H04J 13/0066* (2013.01); *H04J 13/10* (2013.01); *H04L 27/2607* (2013.01); *H04L 27/2613* (2013.01); *H04W 72/10* (2013.01); *H04B 2001/6912* (2013.01)

(56) References Cited

OTHER PUBLICATIONS

International Search Report and Written Opinion—PCT/US2019/015760—ISA/EPO—dated Apr. 8, 2019.
QUALCOMM Incorporated: "Transmitter Side Signal Processing Schemes for NOMA",3GPP Draft, R1-1813405 Transmitter Side Signal Processing Schemes for NOMA, 3rd Generation Partnership Project (3GPP), Mobile Competence Centre, 650, Route Des Lucioles, F-06921 Sophia-Antipolis CEO, vol. RAN WG1, No. Spokane, USA, Nov. 12-16, 2018, Nov. 11, 2018 (Nov. 11, 2018), XP051555444, 14 pages, Retrieved from the Internet:URL:http://www.3gpp.org/ftp/Meetings%5F3GPP%5FSYNC/RAN1/Docs/R1%2D1813405%2Ezip [retrieved on Nov. 11, 2018], Section 3.
Sharp: "Optimized UL RS Design—OZCL Sequences", 3GPP TSG-RAN WG1 #48bis, 3GPP Draft, R1-072053, 3rd Generation Partnership Project (3GPP), Mobile Competence Centre, 650, Route Des Lucioles, F-06921 Sophia-Antipolis Cedex, France, vol. RAN WG1, No. Kobe, Japan, May 2, 2007, May 2, 2007 (May 2, 2007), pp. 1-24, XP050105807, [retrieved on May 2, 2007], Sections 3. and 8.2, p. 13-p. 15.
Song T.C., et al., "Augmenting the Capacity of CDMA Systems", Conference Proceedings / IEEE CCECE 2002 CCGEI, Canadian Conference on Electrical and Computer Engineering, May 12-15, 2002, Hotel Fort Garry, Winnipeg, Manitoba, Canada, IEEE Service Centre, Piscataway, NJ, vol. 3, May 12, 2002 (May 12, 2002), pp. 1226-1230, XP010707506, DOI: 10.1109/CCECE.2002.1012923, ISBN:978-0-7803-7514-7, Section 6.
Vanhaverbeke F., et al., "Symmetric Capacity of Optimal Sequences in Quasi-Scalable CDMA Systems", Information Theory, 2005. ISIT 2005, Proceedings, International Symposium on Adelaide, Australia Sep. 4-9, 2005, Piscataway, NJ, USA,IEEE, Piscataway, NJ, USA, Sep. 4, 2005 (Sep. 4, 2005), pp. 1918-1921, XP010845885, ISBN: 978-0-7803-9151-2, Section I.

* cited by examiner

_US 10,924,167 B2_

FORWARD COMPATIBLE DESIGN FOR NON-ORTHOGONAL UE SIGNATURE SEQUENCES

CROSS REFERENCES

The present Application for patent claims the benefit of U.S. Provisional Patent Application No. 62/625,296 by LEI et al., entitled "Forward Compatible Design For Non-Orthogonal UE Signature Sequences," filed Feb. 1, 2018, assigned to the assignee hereof, and expressly incorporated by reference herein.

BACKGROUND

The following relates generally to wireless communication, and more specifically to forward compatible design for non-orthogonal UE signature sequences.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communication systems, uplink communications from UEs to a base station may be orthogonal in one or more of the time, frequency, spatial, or code dimensions. However, ensuring orthogonality for a number of UEs may lead to inefficiencies in resource allocation. For example, an orthogonal codebook matrix supporting 'N' UEs may use signature sequences of length 'N.' Since the number of UEs in communication with a base station may change dynamically, it may also be desirable to design codebook matrices to be forward compatible with changes in the number 'N' of UEs. Thus, improvements in resource efficiency for supporting uplink communication may be beneficial in wireless communication systems.

SUMMARY

The described techniques relate to improved methods, systems, devices, or apparatuses that support forward compatible design for non-orthogonal UE signature sequences. In some cases, a UE attempting to communicate with a base station may be able to choose a single signature sequence of length 'k' from a plurality of signature sequences in order to assist the base station in distinguishing it from other UEs. In some cases, the number of signature sequences available for use may be based in part on the number of UEs the base station may support for communications. In some cases, the UE or the base station may identify a codebook matrix having a number of rows equal to a first number ('N') corresponding to the number of UEs the base station may support for communications, and a number of columns equal to a second number ('k'), corresponding to a sequence length of the UE specific spreading sequences for communication with the UEs. In some cases, the UE specific signature sequences may be applied to both control and data channels, as well as reference signals such as sounding reference signals (SRS), UL demodulation reference signals (DMRS), etc. For instance, a UE may use a UE specific signature sequences while transmitting a scheduling request (SR) over an uplink control channel, such as a Physical Uplink Control Channel (PUCCH), or short PUCCH. In some cases, a UE may also use a UE specific signature or spreading sequence for data, which may be transmitted over a shared channel, such as a Physical Uplink Shared Channel (PUSCH).

In some cases, a base station may identify one or more additional UEs) for supporting communication with the base station, in addition to the 'N' UEs already supported. In such cases, a larger codebook may be needed to ensure that each UE in communication with the base station has a unique signature sequence. Further, it may be preferable to maintain the Welch Bound Equality (WBE) achieving property of the original codebook. In such cases, a base station may initially identify a codebook matrix having a number of rows equal to the first number ('N') and a number of columns equal to the second number ('k'), where the rows of the codebook may comprise a WBE achieving vector set, and correspond to a first set of UE specific spreading sequences having the sequence length ('k'). Further, the base station may re-use aspects of the original codebook of size 'N×k' to construct a new (or augmented) codebook matrix of size ('N+M'×'k'). In some cases, such a matrix operation may preserve the WBE property in the new codebook matrix. In some other cases, the sequence length 'k' may be modified (i.e., larger or smaller), while preserving the WBE property of the original codebook matrix. Thus, codebook matrices may be designed to be forward compatible and optimal with respect to achieving WBE, and to meet capacity enhancement and coverage extension demands.

A method of wireless communication is described. The method may include identifying, at a UE, a codebook matrix having a number of rows equal to a first number and a number of columns equal to a second number, the first number being equal to a number of UEs supported for communication with a base station and the second number being equal to a sequence length of a set of UE specific signature sequences, wherein the rows of the codebook matrix comprise a Welch bound equality achieving vector set, identifying a UE specific signature sequence based at least in part on a mapping between an identifier associated with the UE to one or more rows of the codebook matrix, and communicating with the base station based at least in part on the UE specific signature sequence.

An apparatus for wireless communication is described. The apparatus may include means for identifying, at a UE, a codebook matrix having a number of rows equal to a first number and a number of columns equal to a second number, the first number being equal to a number of UEs supported for communication with a base station and the second number being equal to a sequence length of a set of UE specific signature sequences, wherein the rows of the codebook matrix comprise a Welch bound equality achieving vector set, means for identifying a UE specific signature sequence based at least in part on a mapping between an identifier associated with the UE to one or more rows of the codebook matrix, and means for communicating with the base station based at least in part on the UE specific signature sequence.

Another apparatus for wireless communication is described. The apparatus may include a processor, memory in electronic communication with the processor, and instructions stored in the memory. The instructions may be operable to cause the processor to identify, at a UE, a codebook matrix having a number of rows equal to a first number and a number of columns equal to a second number, the first number being equal to a number of UEs supported for communication with a base station and the second number being equal to a sequence length of a set of UE specific signature sequences, wherein the rows of the codebook matrix comprise a Welch bound equality achieving vector set, identify a UE specific signature sequence based at least in part on a mapping between an identifier associated with the UE to one or more rows of the codebook matrix, and communicate with the base station based at least in part on the UE specific signature sequence.

A non-transitory computer-readable medium for wireless communication is described. The non-transitory computer-readable medium may include instructions operable to cause a processor to identify, at a UE, a codebook matrix having a number of rows equal to a first number and a number of columns equal to a second number, the first number being equal to a number of UEs supported for communication with a base station and the second number being equal to a sequence length of a set of UE specific signature sequences, wherein the rows of the codebook matrix comprise a Welch bound equality achieving vector set, identify a UE specific signature sequence based at least in part on a mapping between an identifier associated with the UE to one or more rows of the codebook matrix, and communicate with the base station based at least in part on the UE specific signature sequence.

In some examples of the method, apparatus, and non-transitory computer-readable medium described above, identifying the codebook matrix comprises: generating a first orthogonal matrix comprising a number of rows equal to the first number and a number of columns equal to the first number. Some examples of the method, apparatus, and non-transitory computer-readable medium described above may further include processes, features, means, or instructions for removing a number of columns equal to a third number from the first orthogonal matrix to generate the codebook matrix.

In some examples of the method, apparatus, and non-transitory computer-readable medium described above, the first orthogonal matrix may be a discrete Fourier transform matrix.

In some examples of the method, apparatus, and non-transitory computer-readable medium described above, the first orthogonal matrix comprises a plurality of cyclically shifted Zadoff-Chu sequences.

In some examples of the method, apparatus, and non-transitory computer-readable medium described above, identifying the codebook matrix comprises: generating the codebook matrix based at least in part on a chirp sequence function over the first number and the second number.

Some examples of the method, apparatus, and non-transitory computer-readable medium described above may further include processes, features, means, or instructions for receiving, from the base station, an indicator of activation of a supplementary set of UE specific signature sequences having a number of sequences equal to a third number.

In some examples of the method, apparatus, and non-transitory computer-readable medium described above, the identifying the codebook matrix comprises identifying a delta matrix comprising a number of rows equal to the third number and a number of columns equal to the second number, the identifying the UE specific signature sequence may be based at least in part on a mapping between the identifier associated with the UE and one or more rows of the delta matrix.

Some examples of the method, apparatus, and non-transitory computer-readable medium described above may further include processes, features, means, or instructions for receiving, from the base station, an indicator of a change in the sequence length from the second number to a third number. Some examples of the method, apparatus, and non-transitory computer-readable medium described above may further include processes, features, means, or instructions for adding one or more column vectors having lengths of the first number to the codebook matrix to obtain a second codebook matrix, wherein rows of the second codebook matrix comprise a second set of UE specific signature sequences.

Some examples of the method, apparatus, and non-transitory computer-readable medium described above may further include processes, features, means, or instructions for identifying a second UE specific signature sequence based at least in part on a mapping between the identifier associated with the UE to one or more rows of the second codebook matrix. Some examples of the method, apparatus, and non-transitory computer-readable medium described above may further include processes, features, means, or instructions for communicating with the base station based at least in part on the second UE specific signature sequence.

Some examples of the method, apparatus, and non-transitory computer-readable medium described above may further include processes, features, means, or instructions for generating the one or more column vectors according to an orthgonalizing function.

Some examples of the method, apparatus, and non-transitory computer-readable medium described above may further include processes, features, means, or instructions for receiving, from the base station, an indicator of a change in the sequence length from the second number to a third number. Some examples of the method, apparatus, and non-transitory computer-readable medium described above may further include processes, features, means, or instructions for removing one or more orthogonal column vectors of length the first number from the codebook matrix to obtain a second codebook matrix, wherein rows of the second codebook matrix comprise a second set of UE specific signature sequences. Some examples of the method, apparatus, and non-transitory computer-readable medium described above may further include processes, features, means, or instructions for identifying a second UE specific signature sequence based at least in part on a mapping between the identifier associated with the UE to one or more rows of the second codebook matrix. Some examples of the method, apparatus, and non-transitory computer-readable medium described above may further include processes, features, means, or instructions for communicating with the base station based at least in part on the second UE specific signature sequence.

In some examples of the method, apparatus, and non-transitory computer-readable medium described above, the communicating with the base station comprises: applying the UE specific signature sequence to an uplink signal, the uplink signal comprising a reference signal, a control signal, a data signal, or a combination thereof. Some examples of the method, apparatus, and non-transitory computer-readable medium described above may further include processes, features, means, or instructions for transmitting the uplink signal to the base station.

In some examples of the method, apparatus, and non-transitory computer-readable medium described above, the communicating with the base station comprises: receiving a downlink signal from the base station. Some examples of the method, apparatus, and non-transitory computer-readable medium described above may further include processes, features, means, or instructions for applying the UE specific signature sequence to the downlink signal to obtain a reference signal, a control signal, a data signal, or a combination thereof.

A method of wireless communication is described. The method may include receiving, from a core network, a first number representative of a number of UEs supported in communication with the base station and a second number associated with a sequence length of UE specific signature sequences for communicating with the UEs, wherein the second number is less than the first number, identifying a codebook matrix having a number of rows equal to the first number and a number of columns equal to the second number, wherein the rows of the codebook matrix comprise a Welch bound equality achieving vector set, and wherein the rows of the codebook matrix correspond to a first set of UE specific signature sequences having the sequence length, and communicating with one or more UEs based at least in part on the first set of UE specific signature sequences.

An apparatus for wireless communication is described. The apparatus may include means for receiving, from a core network, a first number representative of a number of UEs supported in communication with the base station and a second number associated with a sequence length of UE specific signature sequences for communicating with the UEs, wherein the second number is less than the first number, means for identifying a codebook matrix having a number of rows equal to the first number and a number of columns equal to the second number, wherein the rows of the codebook matrix comprise a Welch bound equality achieving vector set, and wherein the rows of the codebook matrix correspond to a first set of UE specific signature sequences having the sequence length, and means for communicating with one or more UEs based at least in part on the first set of UE specific signature sequences.

Another apparatus for wireless communication is described. The apparatus may include a processor, memory in electronic communication with the processor, and instructions stored in the memory. The instructions may be operable to cause the processor to receive, from a core network, a first number representative of a number of UEs supported in communication with the base station and a second number associated with a sequence length of UE specific signature sequences for communicating with the UEs, wherein the second number is less than the first number, identify a codebook matrix having a number of rows equal to the first number and a number of columns equal to the second number, wherein the rows of the codebook matrix comprise a Welch bound equality achieving vector set, and wherein the rows of the codebook matrix correspond to a first set of UE specific signature sequences having the sequence length, and communicate with one or more UEs based at least in part on the first set of UE specific signature sequences.

A non-transitory computer-readable medium for wireless communication is described. The non-transitory computer-readable medium may include instructions operable to cause a processor to receive, from a core network, a first number representative of a number of UEs supported in communication with the base station and a second number associated with a sequence length of UE specific signature sequences for communicating with the UEs, wherein the second number is less than the first number, identify a codebook matrix having a number of rows equal to the first number and a number of columns equal to the second number, wherein the rows of the codebook matrix comprise a Welch bound equality achieving vector set, and wherein the rows of the codebook matrix correspond to a first set of UE specific signature sequences having the sequence length, and communicate with one or more UEs based at least in part on the first set of UE specific signature sequences.

In some examples of the method, apparatus, and non-transitory computer-readable medium described above, identifying the codebook matrix comprises: generating a first orthogonal matrix comprising a number of rows equal to the first number and a number of columns equal to the first number. Some examples of the method, apparatus, and non-transitory computer-readable medium described above may further include processes, features, means, or instructions for removing a number of columns equal to a third number from the first orthogonal matrix to generate the codebook matrix.

In some examples of the method, apparatus, and non-transitory computer-readable medium described above, the first orthogonal matrix may be a discrete Fourier transform matrix.

In some examples of the method, apparatus, and non-transitory computer-readable medium described above, the first orthogonal matrix comprises a plurality of cyclically shifted Zadoff-Chu sequences.

In some examples of the method, apparatus, and non-transitory computer-readable medium described above, identifying the codebook matrix comprises: generating the codebook matrix based at least in part on a chirp sequence function over the first number and the second number.

Some examples of the method, apparatus, and non-transitory computer-readable medium described above may further include processes, features, means, or instructions for identifying, at the base station, a number of additional UEs equal to a third number for supporting for communication with the base station.

Some examples of the method, apparatus, and non-transitory computer-readable medium described above may further include processes, features, means, or instructions for generating a delta matrix comprising a number of rows equal to the third number and a number of columns equal to the second number. Some examples of the method, apparatus, and non-transitory computer-readable medium described above may further include processes, features, means, or instructions for generating an augmented codebook matrix by appending the delta matrix to the codebook matrix. Some examples of the method, apparatus, and non-transitory computer-readable medium described above may further include processes, features, means, or instructions for communicating with at least one UE based at least in part on the augmented codebook matrix.

In some examples of the method, apparatus, and non-transitory computer-readable medium described above, rows of the augmented codebook matrix comprise a Welch bound equality achieving vector set.

Some examples of the method, apparatus, and non-transitory computer-readable medium described above may further include processes, features, means, or instructions for broadcasting an indicator of activation of a supplementary set of UE specific signature sequences from the delta matrix.

Some examples of the method, apparatus, and non-transitory computer-readable medium described above may further include processes, features, means, or instructions for adding one or more column vectors having lengths of the first number to the codebook matrix to obtain a second codebook matrix, wherein rows of the second codebook matrix comprise a second set of UE specific signature sequences. Some examples of the method, apparatus, and non-transitory computer-readable medium described above may further include processes, features, means, or instructions for communicating with the one or more UEs based at least in part on the second set of UE specific signature sequences.

Some examples of the method, apparatus, and non-transitory computer-readable medium described above may further include processes, features, means, or instructions for generating the one or more column vectors according to an orthogonalizing function.

Some examples of the method, apparatus, and non-transitory computer-readable medium described above may further include processes, features, means, or instructions for removing one or more orthogonal column vectors of length the first number from the codebook matrix to obtain a second codebook matrix, wherein rows of the second codebook matrix comprise a second set of UE specific signature sequences. Some examples of the method, apparatus, and non-transitory computer-readable medium described above may further include processes, features, means, or instructions for communicating with the one or more UEs based at least in part on the second set of UE specific signature sequences.

Some examples of the method, apparatus, and non-transitory computer-readable medium described above may further include processes, features, means, or instructions for broadcasting an indicator of a change in the sequence length from the second number to a third number.

Some examples of the method, apparatus, and non-transitory computer-readable medium described above may further include processes, features, means, or instructions for allocating a first UE specific signature sequence from the first set of rows of the codebook matrix to a first UE based at least in part on a first QoS associated with the first UE. Some examples of the method, apparatus, and non-transitory computer-readable medium described above may further include processes, features, means, or instructions for allocating a second UE specific signature sequence from the second set of rows of the codebook matrix to a second UE based at least in part on a second QoS associated with the second UE.

DETAILED DESCRIPTION

Figure 1:
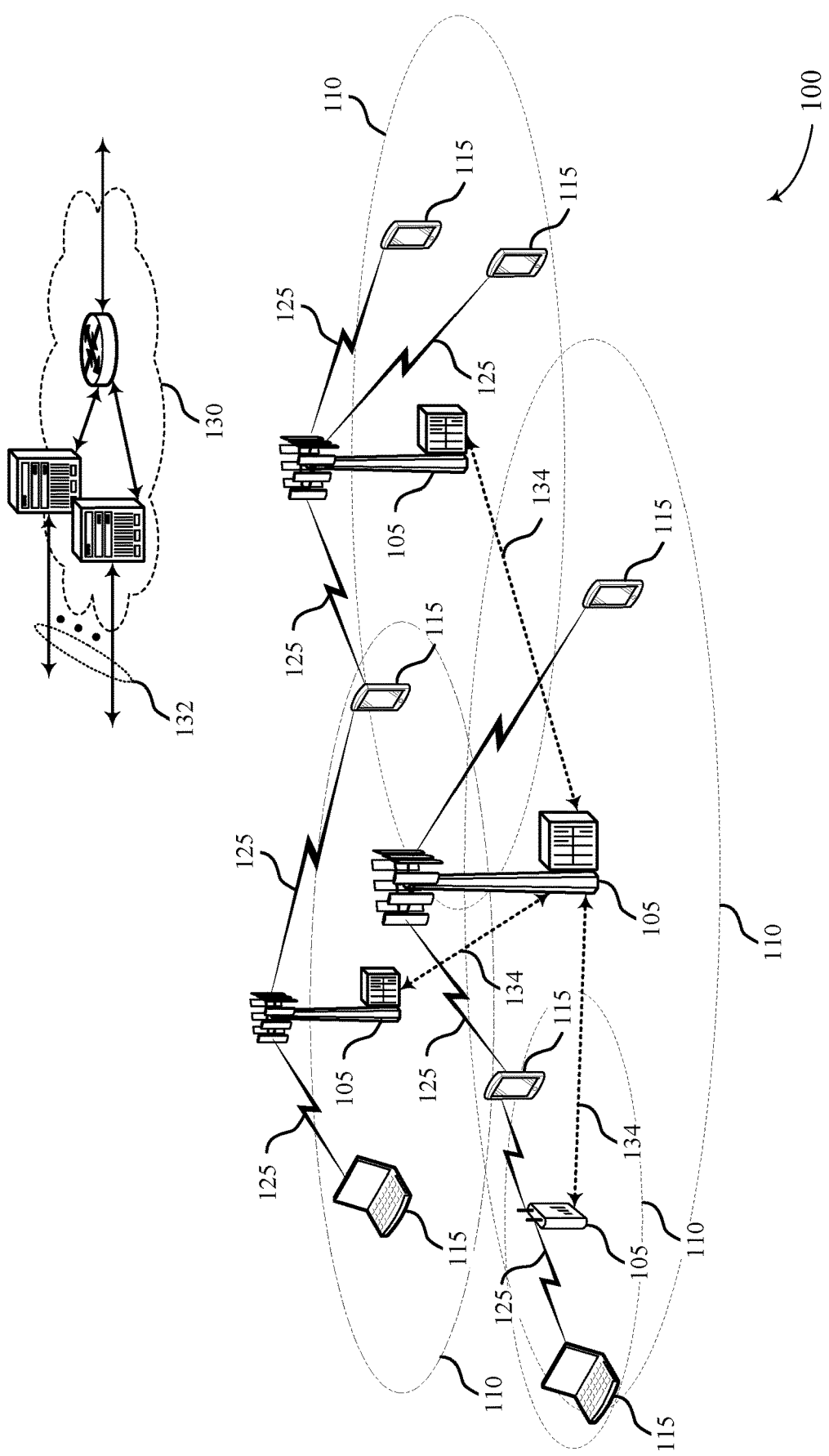
FIG. 1 illustrates an example of a system for wireless communication that supports forward compatible design for non-orthogonal UE signature sequences in accordance with aspects of the present disclosure.

In some wireless communication systems, Non-Orthogonal Multiple Access (NOMA) may be deployed to meet varying demands such as low latency, high-throughput, improved fairness, etc. In some cases, NOMA may utilize common resources such as a time slot, subcarrier(s), or spreading codes to serve multiple users. Further, NOMA may be deployed in the power domain, by serving multiple users in the same time slot and subcarrier(s), and allocating different power levels to different users. For instance, a base station may simultaneously serve two user equipments (UEs) on the same subcarrier(s), by superimposing their messages and assigning different power coefficients or spreading codes. In some cases, the base station may allocate more power to the UE with poorer channel conditions and decode UE messages using techniques such as successive interference cancellation (SIC) treating the other UEs message as noise. In some cases, NOMA may be implemented for both uplink (UL) and downlink (DL) transmissions.

In some cases, a UE attempting to communicate with a base station may be able to choose a single signature sequence of length 'k' from a plurality of signature sequences in order to assist the base station in distinguishing it from other UEs. In some cases, the number of signature sequences available for use may be based in part on the number of UEs the base station may support for communications. In some cases, the UE or the base station may identify a codebook matrix having a number of rows equal to a first number ('N') corresponding to the number of UEs the base station may support for communications, and a number of columns equal to a second number ('k'), corresponding to a sequence length of the UE specific spreading sequences for communication with the UEs. In some cases, the UE specific signature sequences may be applied to both control and data channels, as well as reference signals such as sounding reference signals (SRS), UL demodulation reference signals (DMRS), etc. For instance, a UE may use a UE specific signature sequence (e.g., spreading sequence) while transmitting a scheduling request (SR) over an uplink control channel, such as a Physical Uplink Control Channel (PUCCH), or short PUCCH. In some cases, a UE may also use a UE specific signature for data, which may be transmitted over a shared channel, such as a Physical Uplink Shared Channel (PUSCH). In some other cases, the UE may receive a downlink signal from the base station. The UE may apply its UE specific signature sequence to the downlink signal to obtain its contents, such as a reference signal, a control signal, a data signal, or a combination thereof.

In some cases, it may be desirable to design codebook matrices to be forward compatible and/or optimal with respect to achieving Welch Bound Equality (WBE), in order meet demands pertaining to coverage extension and/or capacity enhancements.

In some cases, a base station may identify one or more additional UEs (e.g., 'M' UEs in addition to the original 'N' UEs) for supporting communication with the base station. In such cases, a larger codebook may be needed to ensure each UE in communication with the base station has a unique signature sequence. Further, it may be preferable to maintain the WBE achieving property of the original codebook. In such cases, a base station may initially identify a codebook matrix having a number of rows equal to the first number ('N') and a number of columns equal to the second number ('k'), where the rows of the codebook may comprise a Welch bound equality achieving vector set, and correspond to a first set of UE specific signature sequences having the sequence length ('k'). Further, the base station may re-use aspects of the original codebook of size 'N×k' to construct a new (or augmented) codebook matrix of size ('N+M'×'k'). In some cases, such a matrix operation may preserve the WBE property in the revised codebook matrix. In some other cases, the sequence length 'k' may need to be modified (i.e., larger or smaller), while preserving the WBE property of the original codebook matrix.

Aspects of the disclosure are initially described in the context of a wireless communications system. Aspects of the disclosure are further illustrated by and described with reference to matrix manipulation diagrams, resource mapping diagrams, apparatus diagrams, system diagrams, and flowcharts that relate to forward compatible design for UE signature sequences in NOMA.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, a UE 115 attempting to communicate with a base station 105 may be able to choose a single signature sequence of length 'k' from a plurality of signature sequences in order to assist the base station 105 in distinguishing it from other UEs. In some cases, the number of signature sequences available for use may be based in part on the number of UEs the base station 105 may support for communications. In some cases, the UE 115 or the base station 105 may identify a codebook matrix having a number of rows equal to a first number ('N') corresponding to the number of UEs the base station 105 may support for communications, and a number of columns equal to a second number ('k'), corresponding to a sequence length of the UE specific spreading sequences for communication with the UEs. In some cases, the UE specific signature sequences may be applied to both UL/DL control and data channels, as well as reference signals such as SRS, UL DMRS, etc. For instance, UE 115 may use a UE specific signature sequences while transmitting a SR over PUCCH. In some cases, UE 115 may also use a UE specific signature or spreading sequence for data, which may be transmitted over a shared channel, such as PUSCH.

In some cases, the base station 105 may identify one or more additional UEs (e.g., 'M' additional UEs) for supporting for communication with the base station, in addition to the 'N' UEs already supported. In such cases, a larger codebook may be needed to ensure that each UE in communication with the base station has a unique signature sequence. Further, it may be preferable to maintain the Welch Bound Equality (WBE) achieving property of the original codebook. In some cases, the base station 105 or UE 115 may re-use aspects of the original codebook of size 'N×k' to construct a new (or augmented) codebook matrix of size ('N+M'×'k'). In some cases, such a matrix operation may preserve the WBE property in the revised codebook matrix. In some other cases, the sequence length 'k' may be modified (i.e., larger or smaller), while preserving the WBE property of the original codebook matrix.

Figure 2:
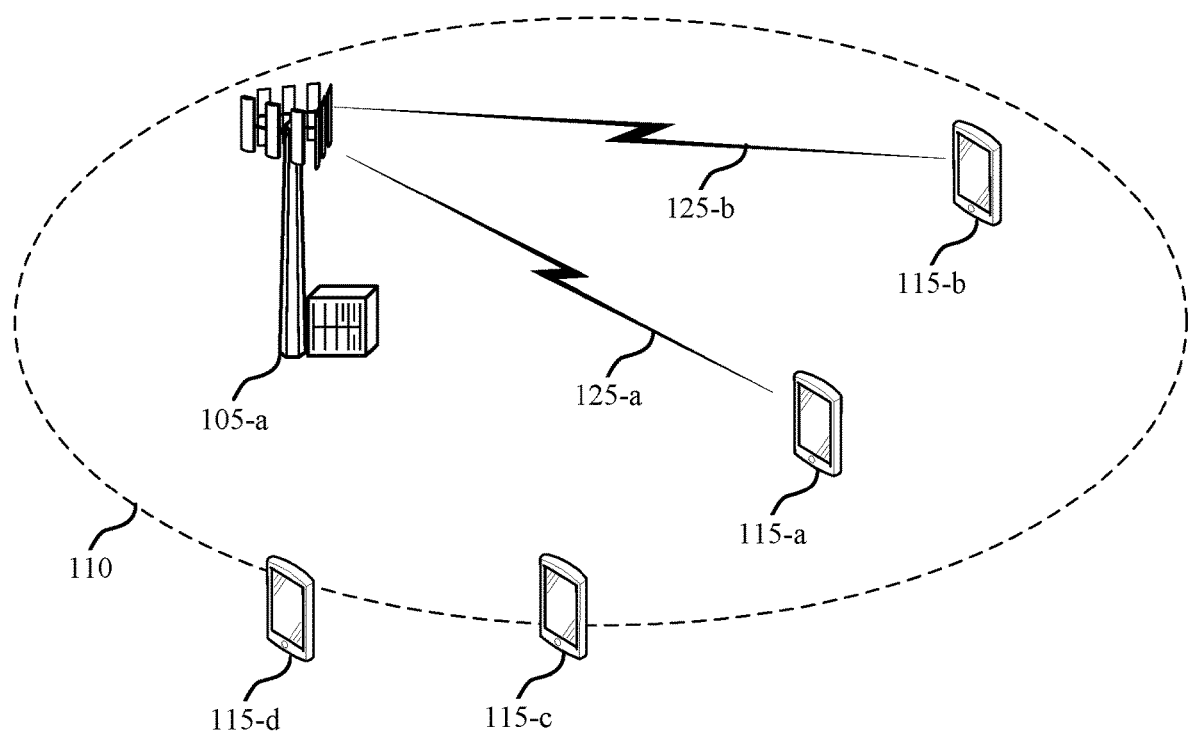
FIG. 2 illustrates an example of a wireless communications system that supports forward compatible design for non-orthogonal UE signature sequences in accordance with aspects of the present disclosure.

FIG. 2 illustrates an example of a wireless communication system 200 that supports forward compatible design for UE signature sequences in NOMA in accordance with various aspects of the present disclosure. In some examples, wireless communication system 200 may implement aspects of wireless communication system 100. The wireless communication system 200 may include one or more UEs 115 (e.g., UE 115-a, UE 115-b, UE 115-c, and UE 115-d), and base station 105-a, which may be examples of the UE 115 and base station 105 described with reference to FIG. 1. Base station 105-a may support communications with UE 115-a and UE 115-b over communication link 125-a and communication link 125-b, respectively. In some cases, wireless communication system 200 may operate in mmW spectrum.

As described above, a UE 115 (e.g., UE 115-a, UE 115-b, or both) attempting to communicate with a base station may identify a signature sequence of length 'k' from a plurality of signature sequences in order to assist the base station 105-a in distinguishing it from other UEs. In some cases, the number of signature sequences available for use may be based in part on the number of UEs the base station supports for communications. Thus, the UEs 115, the base station 105-a, or both, may identify a codebook matrix having a number of rows equal to a first number ('N') corresponding to the number of UEs the base station may support for communications, and a number of columns equal to a second number ('k'), corresponding to a sequence length of the UE specific spreading sequences for communication with the UEs. In some cases, if N=k, the codebook may be an example of an orthogonal codebook. In other cases, if N>k, the codebook may be referred to as a NOMA codebook. In some cases, the UE specific signature sequences may be applied to both control and data channels, as well as reference signal transmissions.

In some examples, a codebook of signature sequences may be denoted by:

$$\Theta_{N \times K} \triangleq [S_1 S_2 \ldots S_N]^T \tag{1}$$

with the $n^{th}$ spreading/signature sequence given by:

$$S_n \triangleq [s_n(1) s_n(2) \ldots s_n(K)]^T \tag{2}$$

The pair-wise correlation between two sequences may be given by:

$$C_{m,n} \triangleq \sum_{k=1}^{K} s_m(k) s^*_n(k) \tag{3}$$

and the correlation metric of a codebook given by:

$$\gamma \triangleq \Sigma_{m=1}^{N}\Sigma_{n=1}^{N}|C_{m,n}|^{2}; \quad (4)$$

As previously described, to support increasing demands for coverage extension, capacity enhancement, and user fairness, it may be desirable to design codebook matrices to be forward compatible and/or optimized with respect to achieving WBE. In some cases, the codebook matrix may be generated by the base station 105-*a*, either autonomously, or based in part on a configuration (i.e., values for N, k, etc.) received from a core network (not shown). In some cases, the UEs 115 may identify and generate the codebook matrix, based in part on signaling received from the base station. In some cases, a WBE achieving codebook may be constructed starting from a unit magnitude orthogonal matrix Θ (i.e., of size N by N), such as a discrete fourier transform (DFT) matrix (e.g., $\phi_n(k) \triangleq \exp(j2\pi nk/N)$, 1≤n, k≤N), or a matrix constructed by cyclic shifting Zadoff-Chu (ZC) sequences (e.g., $\phi_n(k) \triangleq \exp(j\pi r(n+k)(n+k+\langle N\rangle_2)/N)$, 1≤n, k≤N and gcd(N,r)=1), where gcd is the greatest common denominator. In some cases, all columns of the resultant matrix Θ may be orthogonal. Following generating the orthogonal matrix Θ, 'N–k' columns of Θ may be truncated or removed to form the codebook matrix of size N by k, where the 'k' columns of the codebook matrix are orthogonal. In some cases, a WBE achieving codebook may be obtained by employing each row of the codebook matrix as a signature sequence of length 'k', where the rank of codebook matrix is 'k', and each constructed signature sequence is distinct. In some aspects, a UE specific signature sequence for a given UE 115 may be identified based on a mapping between an identifier associated with the UE 115 (e.g., UE 115-*a* or UE 115-*b*), and one or more rows of the codebook matrix.

In some other cases, a WBE achieving codebook may be generated directly, for example, via chirp sequences. In some cases, a chirp sequence function (such as one of those shown below), may be applied over the first number 'N' and the second number 'k', to generate the elements of the codebook matrix. Similar to the truncation method described above, each row of the codebook may be employed as a signature sequence of length 'k'.

Example chirp sequence functions include:

$$s_n(k) \triangleq \frac{1}{\sqrt{K}} \exp\left(\frac{j\pi(k+n+\theta)(k+n+1+\theta)}{N}\right); \quad (5)$$
$$1 \le k \le K, 1 \le n \le N, -N \le \theta < N$$

or, $$s_n(k) \triangleq \frac{1}{\sqrt{K}} \exp\left(\frac{j\pi(k+n+\theta)^2}{N}\right); \quad (6)$$
$$1 \le k \le K, 1 \le n \le N, -N \le \theta < N.$$

or, $$s_n(k) \triangleq \quad (7)$$

$$\begin{cases} \frac{1}{\sqrt{K}}\exp\left(\frac{j2\pi(k+n+\theta)(k+n+1+\theta)}{N}\right); & 1 \le k \le K, 1 \le n \le \frac{N}{2}, \\ & -N \le \theta < N \\ \frac{1}{\sqrt{K}}\exp\left(\frac{j2\pi(k+n+\theta)^2}{N}\right); & 1 \le k \le K, N/2 \le n \le N, \\ & -N \le \theta < N \end{cases}$$

In some cases, base station 105-*a*, or the core network may identify 'M' additional UEs 115 (e.g., UE 115-*c* and UE 115-*d*) for supporting communication with the base station 105-*a*. In some cases, this may be referred to as an augmented NOMA system, where 'N+M' UEs are in operation. In such cases, a larger codebook may be needed to ensure each UE in communication with the base station has a unique signature sequence. In some cases, the base station 105-*a* may reuse the original codebook of size N by k, where N≥k. It should be noted that all the columns of the augmented codebook matrix may be mutually orthogonal. Further, the augmented codebook matrix may include the original codebook matrix and a delta codebook matrix, where the delta codebook matrix may be generated by any of the methods described above (e.g., truncation of an orthogonal matrix or direct generation using chirp sequences).

In some cases, the modification of the original codebook matrix may be initiated by the base station 105-*a*. In other cases, the modification may be initiated by the core network, and may be signaled to the base station 105-*a* via backhaul signaling. The base station 105-*a* may transmit or broadcast an indicator of the modification via physical channels such as a Physical Broadcast Channel (PBCH), a group common Physical Downlink Control Channel (PDCCH), a Physical Downlink Shared Channel (PDSCH), or a Remaining Minimum System Information (RMSI) transmitted in NR-PDSCH. For instance, the base station 105-*a* may augment the original codebook matrix with a WBE achieving delta codebook matrix (Δ) of size M by k, where M≥k. Further, the delta codebook matrix may be constructed according to any of the methods used to generate the original codebook matrix. It should be noted that, by design, the signature sequences of the delta codebook matrix may be separate and distinct from the signature sequences of the original codebook. In some cases, the delta codebook matrix may be appended to the original codebook matrix to generate the augmented codebook matrix, by one or more matrix manipulation operations. In some cases, the base station 105-*a* may broadcast an indication that a supplementary set of UE specific signature sequences from the delta codebook matrix is activated. In some cases, a new UE (e.g., UE 115-*c*) may receive the indicator of activation of the supplementary set of UE specific signature sequences (e.g., based on RMSI broadcast by the base station 105-*a*). In such cases, UE 115-*c* may identify a signature sequence from the delta matrix conveyed from the base station, or generated by the UE 115-*c*.

Figure 3:
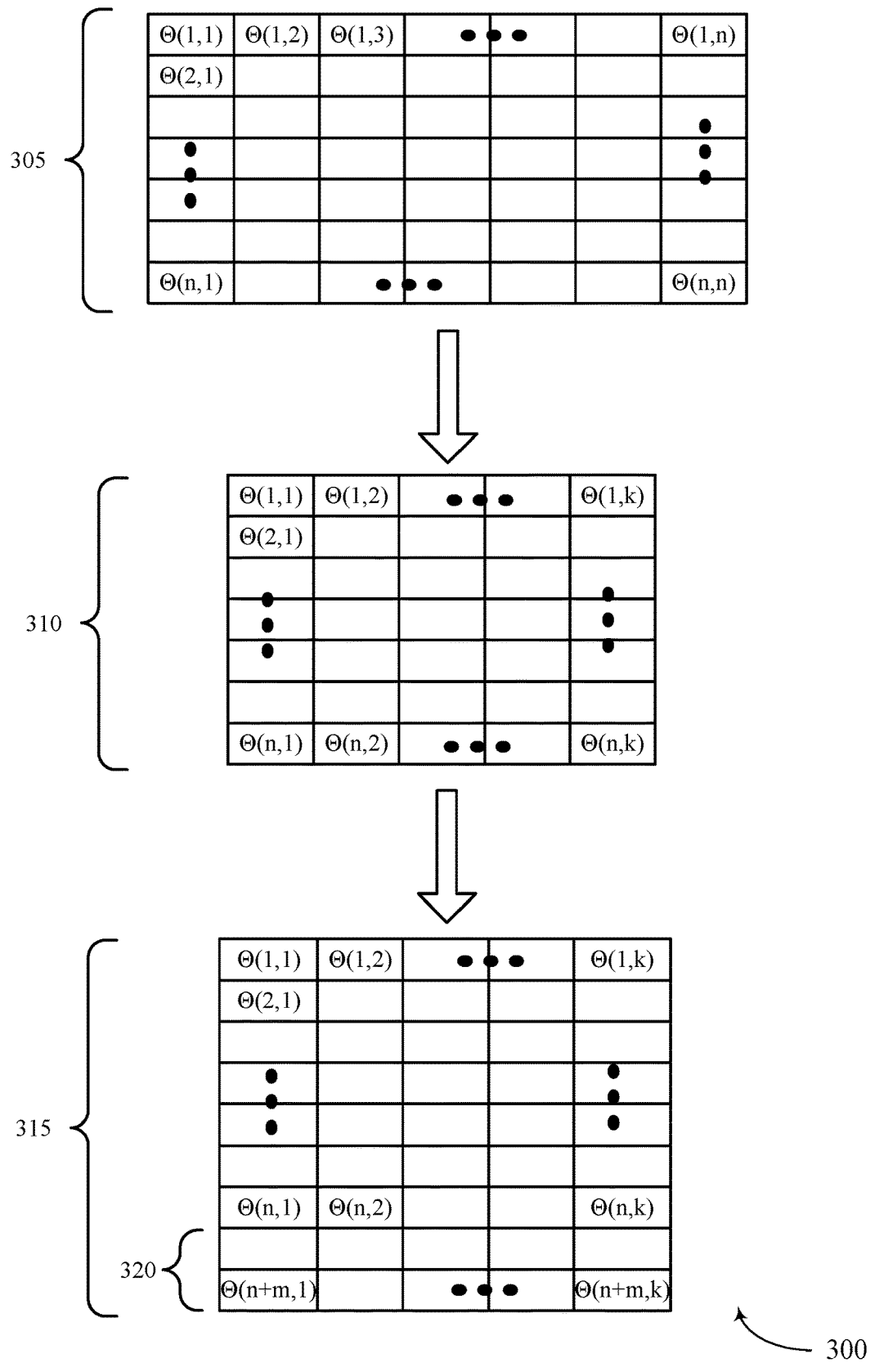
FIG. 3 illustrates an example of a matrix manipulation process that supports forward compatible design for non-orthogonal UE signature sequences in accordance with aspects of the present disclosure.

FIG. 3 illustrates an example of a matrix manipulation process 300 that supports forward compatible design for non-orthogonal UE signature sequences in accordance with various aspects of the present disclosure. In some examples, matrix manipulation process 300 may be implemented by a UE, a base station, or a core network, which may be examples of the UE 115, base station 105, or core network described with reference to FIGS. 1 and 2.

As described with reference to FIG. 2, in some cases a WBE achieving codebook may be constructed starting from a unit magnitude orthogonal matrix 305 (Θ) (e.g., of size n by n), such as a DFT matrix, or a matrix constructed by cyclic shifting of ZC sequences. Further, all columns of Θ may be orthogonal. Following generating the unit magnitude orthogonal matrix 305, 'n–k' columns of Θ may be truncated or removed to form the codebook matrix 310 of size n by k, where the 'k' columns of the codebook matrix are orthogonal. In the example shown, WBE achieving codebook matrix 310 is obtained by employing each row of the codebook matrix as a signature sequence of length 'k', where the rank of the codebook matrix is 'k', and each constructed signature sequence is distinct. It should be noted that, while codebook matrix 310 has been obtained by removing the last columns from the unit magnitude orthogonal matrix 305, removing any arbitrary columns may achieve the same result. In some cases, the codebook matrix 310 may be generated by the base station, either autonomously, or based in part on a configuration (i.e., values for n, k, etc.) received from a core network. Additionally or alternatively, a UE supported for communication by the base station may receive an indication of at least the 'n' and 'k' values from the base station to generate the codebook matrix 310 as described above.

In some cases, a base station, or core network component may identify one or more additional UEs (m') for supporting communication with the base station. In some cases, the base station may reuse the original (or legacy) codebook 310 of size n by k, where n≥k, and further modify it. In some cases, the modification of the codebook matrix 310 may be initiated by the base station or a core network, and may be signaled via physical channels such as PBCH, group common PDCCH or PDSCH, or RMSI transmitted in NR-PDSCH. For instance, the base station may augment the original codebook matrix with a WBE achieving delta codebook matrix ($\Delta$) 320 of size m by k. Further, the delta codebook matrix 320 may be constructed according to any of the methods used to generate the original codebook matrix. It should be noted that, by design, the signature sequences of the delta codebook matrix 320 may be separate and distinct from the signature sequences of the original codebook.

In some cases, the delta codebook matrix 320 may be appended to the original codebook matrix 310 to generate the augmented codebook matrix 315, by one or more matrix manipulation operations. For instance, the augmented codebook matrix of size '(n+m) by k' may be represented by: $\Theta' \triangleq [\Theta^T \Delta^T]^T$ where $\Theta$ now represents the codebook matrix 310. In some cases, $\Theta'$ may be a WBE achieving codebook, and the columns of $\Theta'$ may be mutually orthogonal. In some cases, the one or more new UEs (i.e., 'm' UEs) attempting to communicate with the base station may select a UE specific signature sequence from the delta codebook matrix 320 (e.g., based on a mapping between an identifier of the UE and one or more rows of the delta codebook matrix 320), which may in turn be based in part on signaling from the base station. For example, the base station may broadcast an indication of activation of a supplementary set of UE specific signature sequences from the delta codebook matrix 320. In some cases, all UEs (i.e., original set and new set) may identify a UE specific signature sequence from the augmented codebook matrix 315, where the identifying is based at least in part on a mapping between an identifier associated with the UE and one or more rows of the augmented codebook matrix 315. Thus, UEs with already assigned UE specific signature sequences from the original codebook matrix may reselect E specific signature sequences from the augmented codebook matrix. In some cases, if a UE has an on-going HARQ process operation (e.g., pending retransmissions), the UE may continue to use the same signature sequence until the code blocks have been successfully received.

In some cases, codebook matrix 310, or augmented codebook matrix 315 may be partitioned into one or more subsets, each with different correlation properties, and allocated to different groups of UEs with varying Quality of Service (QoS) requirements. In some cases, the codebook matrix may be generated via one of the techniques described above, prior to partitioning based on different correlation properties of the rows. In some other cases, multiple subset matrices with varying correlation properties may be generated via the same or different techniques prior to augmentation.

Figure 4:
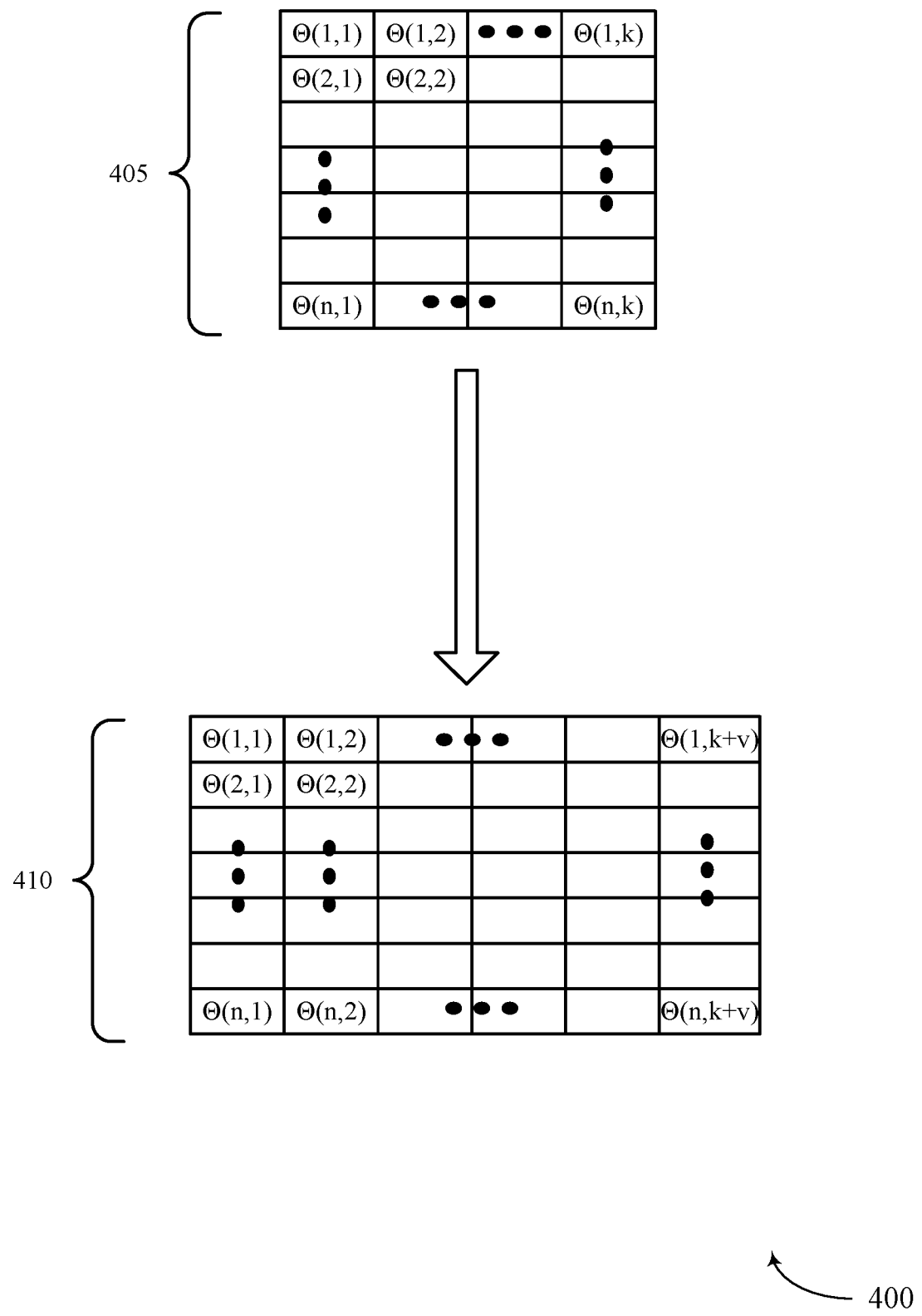
FIG. 4 illustrates an example of a matrix manipulation process that supports forward compatible design for non-orthogonal UE signature sequences in accordance with aspects of the present disclosure.

FIG. 4 illustrates an example of a matrix manipulation process 400 that supports forward compatible design for non-orthogonal UE signature sequences in accordance with various aspects of the present disclosure. In some examples, matrix manipulation process 400 may be implemented by a UE, a base station, or a core network component, which may be examples of the UE 115, base station 105, or core network component described with reference to FIGS. 1 and 2.

In some cases, a base station or core network may add (or remove) one or more column vectors of length 'n' to an original codebook matrix 405, in order to modify the length of the UE specific signature sequences. In some aspects, the one or more column vectors may be generated according to an orthonormalising (or orthogonalizing) function. The base station may broadcast an indication of the change in sequence length. In some cases, a UE may receive the indicator of the change in the sequence length from a base station. For instance, to increase the sequence length from 'k' to 'k+v', where $1 \leq v \leq N-k$, the base station and/or UE may invoke the Gram-Schmidt process to the original codebook matrix, $\Theta$, and add v orthogonal column vectors of length 'n' to generate new codebook matrix 410 ($\Theta^+$), where $\Theta^+ \triangleq [\Theta_{N \times K} \ \Gamma_{N \times v}]$. In some cases, each row of $\Theta^+$ may be used as a length k+v signature sequence for NOMA. In some cases, $\Theta^+$ may preserve the WBE achieving property of $\Theta$, since by construction all the columns are mutually orthogonal. In the example illustrated in FIG. 4, 'n' is 7, 'k' is 5, and 'v' is 2.

Similarly, in order to reduce the sequence length from 'k' to 'k-v', any v columns of $\Theta$ may be removed to form a WBE achieving sub matrix of size 'n' by 'k-v', where each row of the sub matrix may be used as a signature sequence. In some cases, the base station may signal the original UEs supported for communication with the base station that a length of the signature sequences has been modified. Further, network implementation may require that all UEs in communication with a base station may need a common signature sequence length. In such cases, the UEs using signature sequences of length 'k', may truncate or remove one or more elements from rows associated with their UE identifiers, or reselect a signature sequence from the new codebook matrix 410, based in part on a mapping between the identifier associated with the UE to one or more rows of the new codebook matrix 410.

Figure 5:
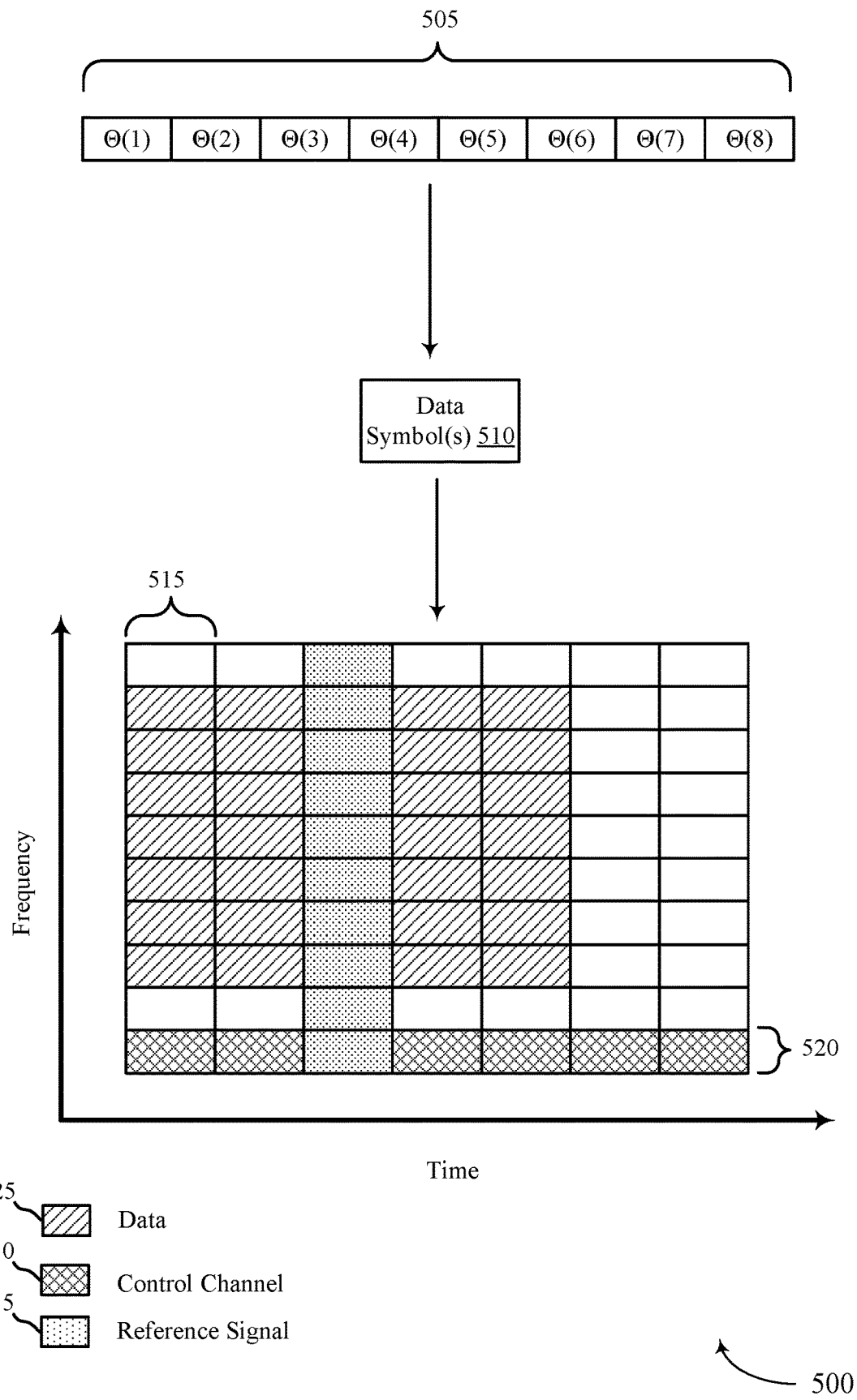
FIG. 5 illustrates an example of a resource mapping process that supports forward compatible design for non-orthogonal UE signature sequences in accordance with aspects of the present disclosure.

FIG. 5 illustrates an example of a resource mapping process 500 that supports forward compatible design for non-orthogonal UE signature sequences in accordance with various aspects of the present disclosure. In some examples, resource mapping process 500 may implement aspects of wireless communication system 100, and may be performed by a UE 115, as described with reference to FIGS. 1 and 2.

In some cases, a UE 115 may identify a UE specific signature sequence 505 from a codebook matrix (not shown), based in part on a mapping between an identifier associated with the UE and to one or more rows of the codebook matrix. In the example illustrated in FIG. 5, signature sequence 505 is of length 'k', where k=8. Further, the row of the codebook matrix may comprise a WBE achieving vector set. As previously described, the codebook matrix may have been generated via truncation of a unit magnitude orthogonal matrix (e.g., DFT matrix or cyclic shifting of ZC sequences), or a chirp sequence function over 'n' and 'k'.

In some cases, the UE 115 may then combine the signature sequence 505 with one or more information symbols 510 to generate a set of information symbols (not shown).

For instance, the UE 115 may apply the signature sequence 505 to information symbols 510 associated with an uplink signal, such as a reference signal, control signal, data signal, or a combination. In some cases, the UE 115 may then proceed to map the generated set of information symbols to a plurality of physical resources, such as time resources 515 (e.g., a slot), and frequency resources 520 (e.g., a subcarrier). The UE may then transmit data 525, control channel 530, and reference signal 535 to a base station 105.

Figure 6:
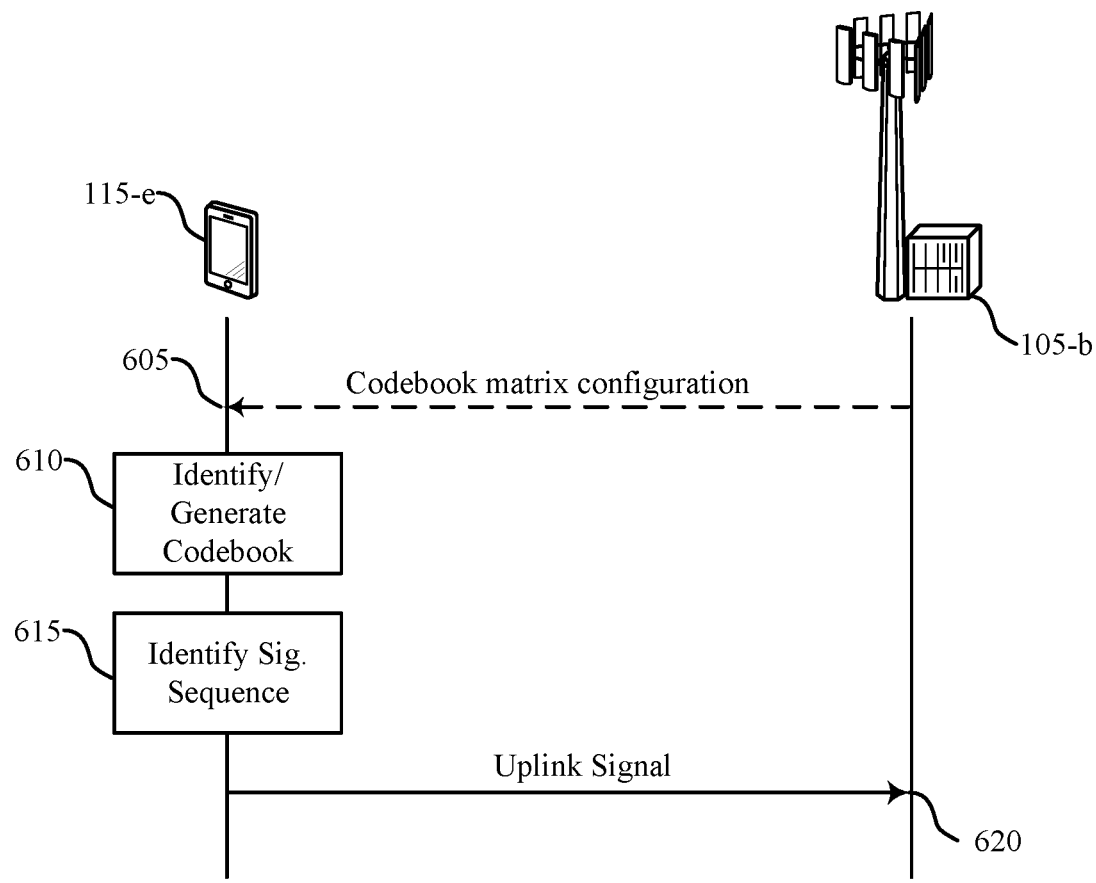
FIG. 6 illustrates an example of a process flow that supports forward compatible design for non-orthogonal UE signature sequences in accordance with aspects of the present disclosure.

FIG. 6 illustrates an example of a process flow 600 that supports forward compatible design for non-orthogonal UE signature sequences in accordance with various aspects of the present disclosure. In some examples, process flow 600 may implement aspects of wireless communications system 100 and/or 200. Furthermore, process flow 600 may be implemented by a UE 115-e, a base station 105-b, or a core network component (not shown), which may be examples of a UE 115 and a base station 105, as described with reference to FIGS. 1 and 2. In some examples, the process illustrated by process flow diagram 600 may be implemented in a wireless communications system operating in mmW spectrum.

In some cases, at 605, base station 105-b may transmit an indication of a codebook matrix configuration to UE 115-e, as described with reference to FIGS. 1 and 2. For instance, base station 105-b may transmit an indication of a size of the codebook (i.e., number of rows 'n' and number of columns 'k'), where 'n' is the number of UEs supported for communication with the base station 105-b, and 'k' is a sequence length of UE specific signature sequences for communicating with the one or more UEs. In some cases, the number 'n' of supported UEs at the base station 105-b and sequence length of UE specific signature sequences may be received at the base station 105-b from a core network.

At 610, UE 115-e may identify a codebook matrix having 'n' rows and 'k' columns, where the rows of the codebook matrix comprise a WBE achieving vector set, and where each row of the codebook matrix corresponds to a set of UE specific signature sequences having the sequence length 'k'. As previously described, identifying the codebook matrix may comprise generating the codebook matrix by truncating an orthogonal matrix of size 'n by n', to form a matrix of size 'n by k', or any other method described with reference to FIGS. 1-4. In some other cases, the codebook may be predefined by the network or base station 105-b, and the UE 115-e may utilize a lookup table to identify the codebook matrix.

At 615, the UE 115-e may identify a signature sequence from the identified codebook matrix, where identifying the signature sequence is based in part on a mapping between an identifier associated with the UE 115-e to one or more rows of the codebook matrix.

At 620, the UE 115-e may proceed to communicate with the base station (e.g., transmitting an uplink signal), based in part on the identified UE specific signature.

Figure 7:
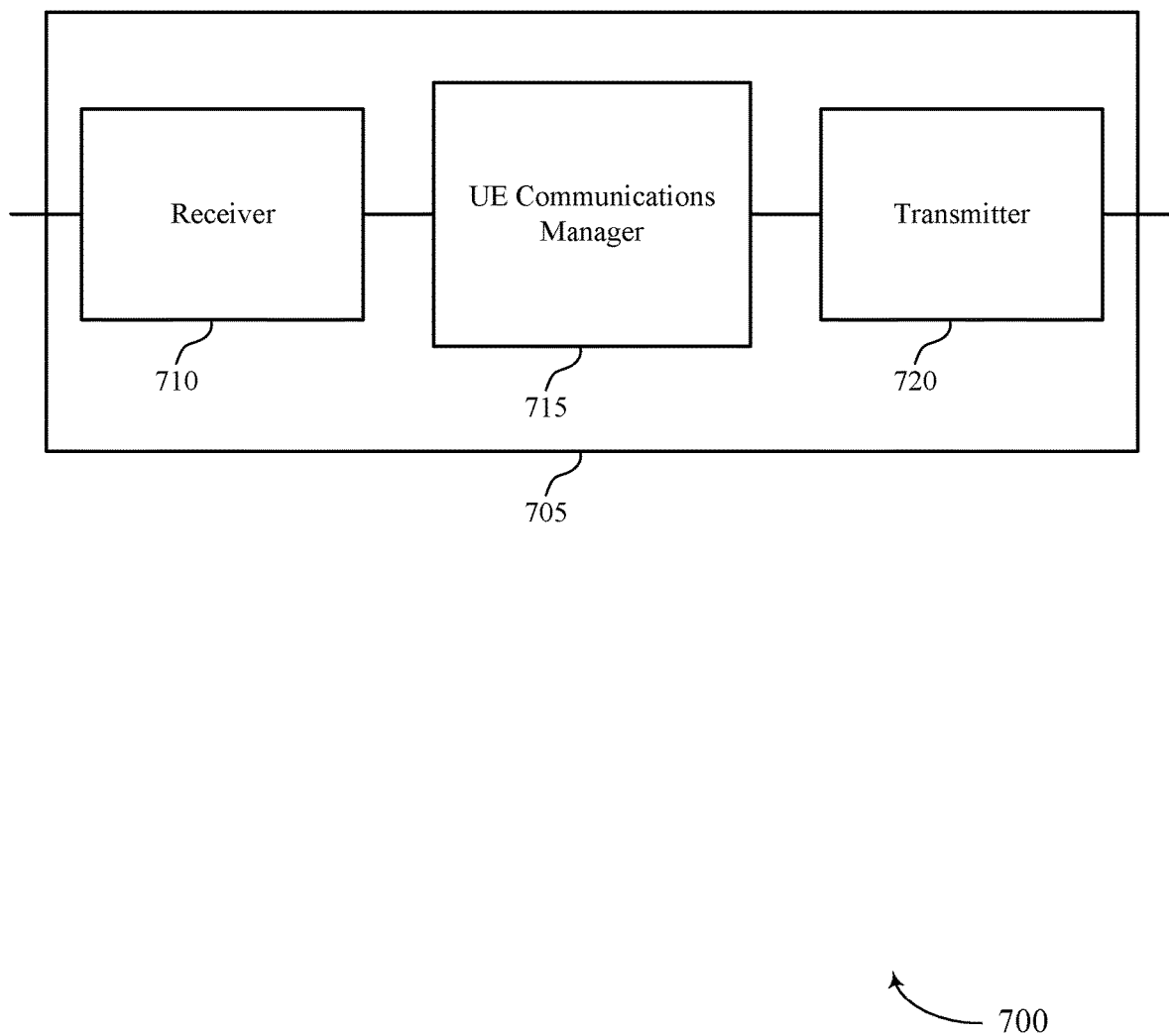
FIGS. 7 through 9 show block diagrams of a device that supports forward compatible design for non-orthogonal UE signature sequences in accordance with aspects of the present disclosure.

FIG. 7 shows a block diagram 700 of a wireless device 705 that supports forward compatible design for non-orthogonal UE signature sequences in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive a downlink signal from a base station, comprising information such as packets, user data, or control information associated with various information channels (e.g., control channels, data channels, and information related to forward compatible design for UE signature sequences in NOMA, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may identify, at a UE, a codebook matrix having a number of rows equal to a first number and a number of columns equal to a second number, the first number equal to a number of UEs supported for communication with a base station and the second number equal to a sequence length of a set of UE specific signature sequences, where the rows of the codebook matrix include a Welch bound equality achieving vector set, identify a UE specific signature sequence based on a mapping between an identifier associated with the UE to one or more rows of the codebook matrix, and communicate with the base station based on the UE specific signature sequence.

Transmitter 720 may transmit signals (e.g., uplink signal to the base station) generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
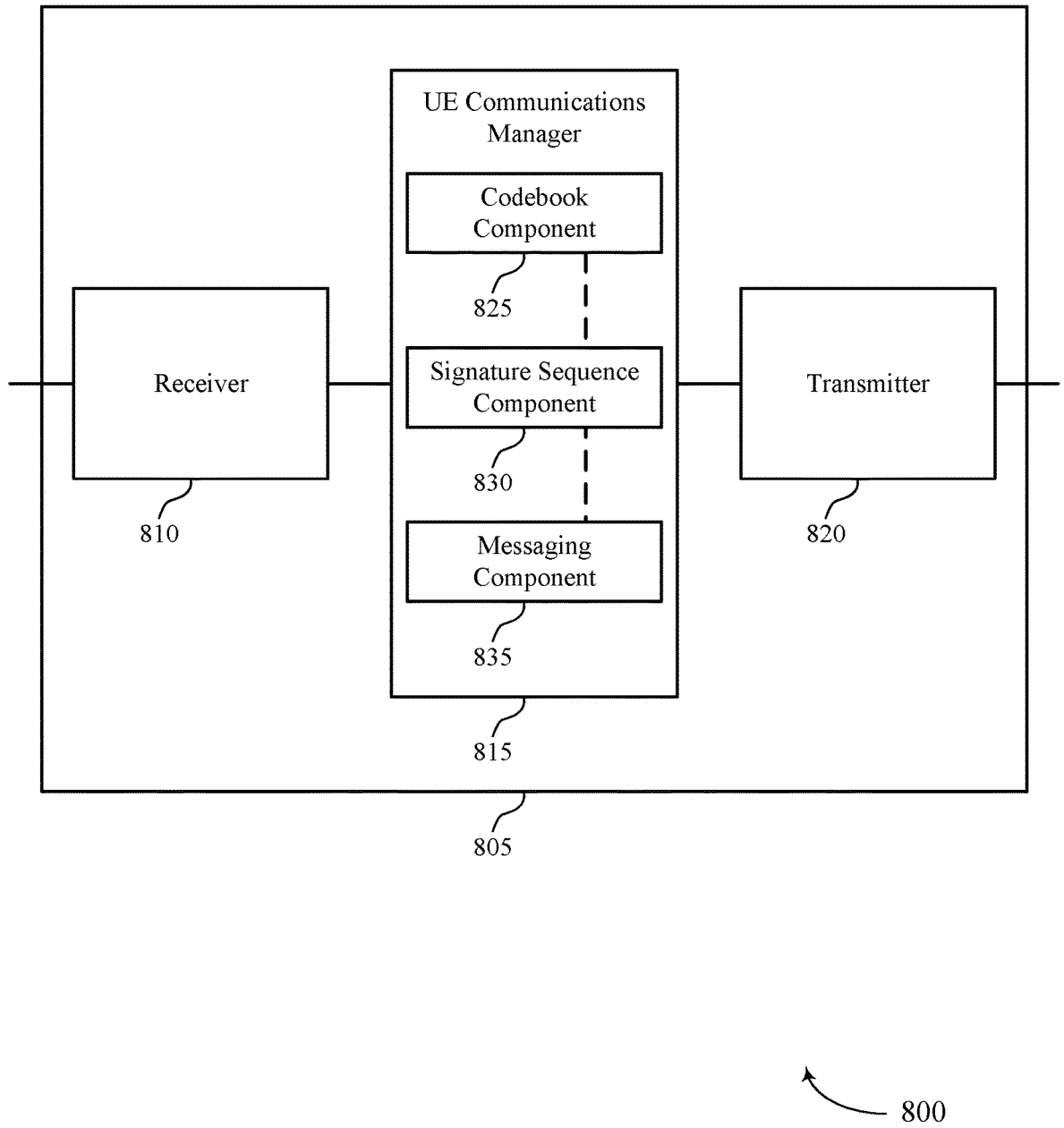

FIG. 8 shows a block diagram 800 of a wireless device 805 that supports forward compatible design for non-orthogonal UE signature sequences in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to forward compatible design for UE signature sequences in NOMA, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10.

UE communications manager 815 may also include codebook component 825, signature sequence component 830, and messaging component 835.

Codebook component 825 may identify, at a UE, a codebook matrix having a number of rows equal to a first number and a number of columns equal to a second number, the first number equal to a number of UEs supported for communication with a base station and the second number equal to a sequence length of a set of UE specific signature sequences, where the rows of the codebook matrix include a Welch bound equality achieving vector set and generate the one or more column vectors according to an orthonormalising (or orthogonalizing) function. In some cases, identifying the codebook matrix includes: generating a first orthogonal matrix including a number of rows equal to the first number and a number of columns equal to the first number, and removing a number of columns equal to a third number from the first orthogonal matrix to generate the codebook matrix. In some cases, the first orthogonal matrix is a discrete Fourier transform matrix. In some cases, the first orthogonal matrix includes a set of cyclically shifted Zadoff-Chu sequences. In some cases, identifying the codebook matrix includes: generating the codebook matrix based on a chirp sequence function over the first number and the second number. In some cases, the identifying the codebook matrix includes identifying a delta matrix including a number of rows equal to the third number and a number of columns equal to the second number, and the identifying the UE specific signature sequence is based on a mapping between the identifier associated with the UE and one or more rows of the delta matrix.

Signature sequence component 830 may identify a UE specific signature sequence based on a mapping between an identifier associated with the UE to one or more rows of the codebook matrix, receive, from the base station, an indicator of activation of a supplementary set of UE specific signature sequences having a number of sequences equal to a third number, receive, from the base station, an indicator of a change in the sequence length from the second number to a third number, identify a second UE specific signature sequence based on a mapping between the identifier associated with the UE to one or more rows of the second codebook matrix, and apply the UE specific signature sequence to the downlink signal to obtain a reference signal, a control signal, a data signal, or a combination thereof. In some cases, the communicating with the base station includes: applying the UE specific signature sequence to an uplink signal, the uplink signal including a reference signal, a control signal, a data signal, or a combination thereof.

Messaging component 835 may communicate with the base station based on the UE specific signature sequence or the second UE specific signature sequence.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
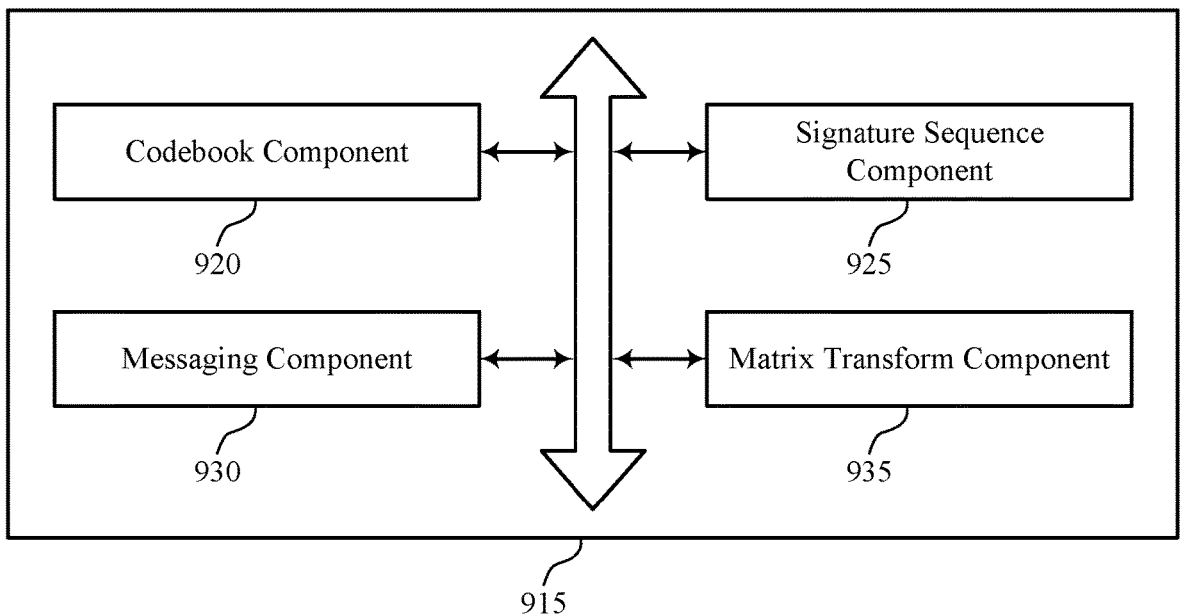

FIG. 9 shows a block diagram 900 of a UE communications manager 915 that supports forward compatible design for non-orthogonal UE signature sequences in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include codebook component 920, signature sequence component 925, messaging component 930, and matrix transform component 935. Each of these modules may communicate, directly or indirectly, with one another (e.g., via one or more buses).

Codebook component 920 may identify, at a UE, a codebook matrix having a number of rows equal to a first number and a number of columns equal to a second number, the first number equal to a number of UEs supported for communication with a base station and the second number equal to a sequence length of a set of UE specific signature sequences, where the rows of the codebook matrix include a Welch bound equality achieving vector set and generate the one or more column vectors according to an orthonormalising function. In some cases, identifying the codebook matrix includes: generating a first orthogonal matrix including a number of rows equal to the first number and a number of columns equal to the first number, and removing a number of columns equal to a third number from the first orthogonal matrix to generate the codebook matrix. In some cases, the first orthogonal matrix is a discrete Fourier transform matrix. In some cases, the first orthogonal matrix includes a set of cyclically shifted Zadoff-Chu sequences. In some cases, identifying the codebook matrix includes: generating the codebook matrix based on a chirp sequence function over the first number and the second number. In some cases, the identifying the codebook matrix includes identifying a delta matrix including a number of rows equal to the third number and a number of columns equal to the second number, the identifying the UE specific signature sequence is based on a mapping between the identifier associated with the UE and one or more rows of the delta matrix.

Signature sequence component 925 may identify a UE specific signature sequence based on a mapping between an identifier associated with the UE to one or more rows of the codebook matrix, receive, from the base station, an indicator of activation of a supplementary set of UE specific signature sequences having a number of sequences equal to a third number, receive, from the base station, an indicator of a change in the sequence length from the second number to a third number, identify a second UE specific signature sequence based on a mapping between the identifier associated with the UE to one or more rows of the second codebook matrix, and apply the UE specific signature sequence to the downlink signal to obtain a reference signal, a control signal, a data signal, or a combination thereof. In some cases, the communicating with the base station includes: applying the UE specific signature sequence to an uplink signal, the uplink signal including a reference signal, a control signal, a data signal, or a combination thereof.

Messaging component 930 may communicate with the base station based on the UE specific signature sequence or the second UE specific signature sequence.

Matrix transform component 935 may remove a number of columns equal to a third number from the first orthogonal matrix to generate the codebook matrix, add one or more column vectors having lengths of the first number to the codebook matrix to obtain a second codebook matrix, where rows of the second codebook matrix include a second set of UE specific signature sequences, or, remove one or more orthogonal column vectors of length the first number from the codebook matrix to obtain a second codebook matrix, where rows of the second codebook matrix include a second set of UE specific signature sequences.

Figure 10:
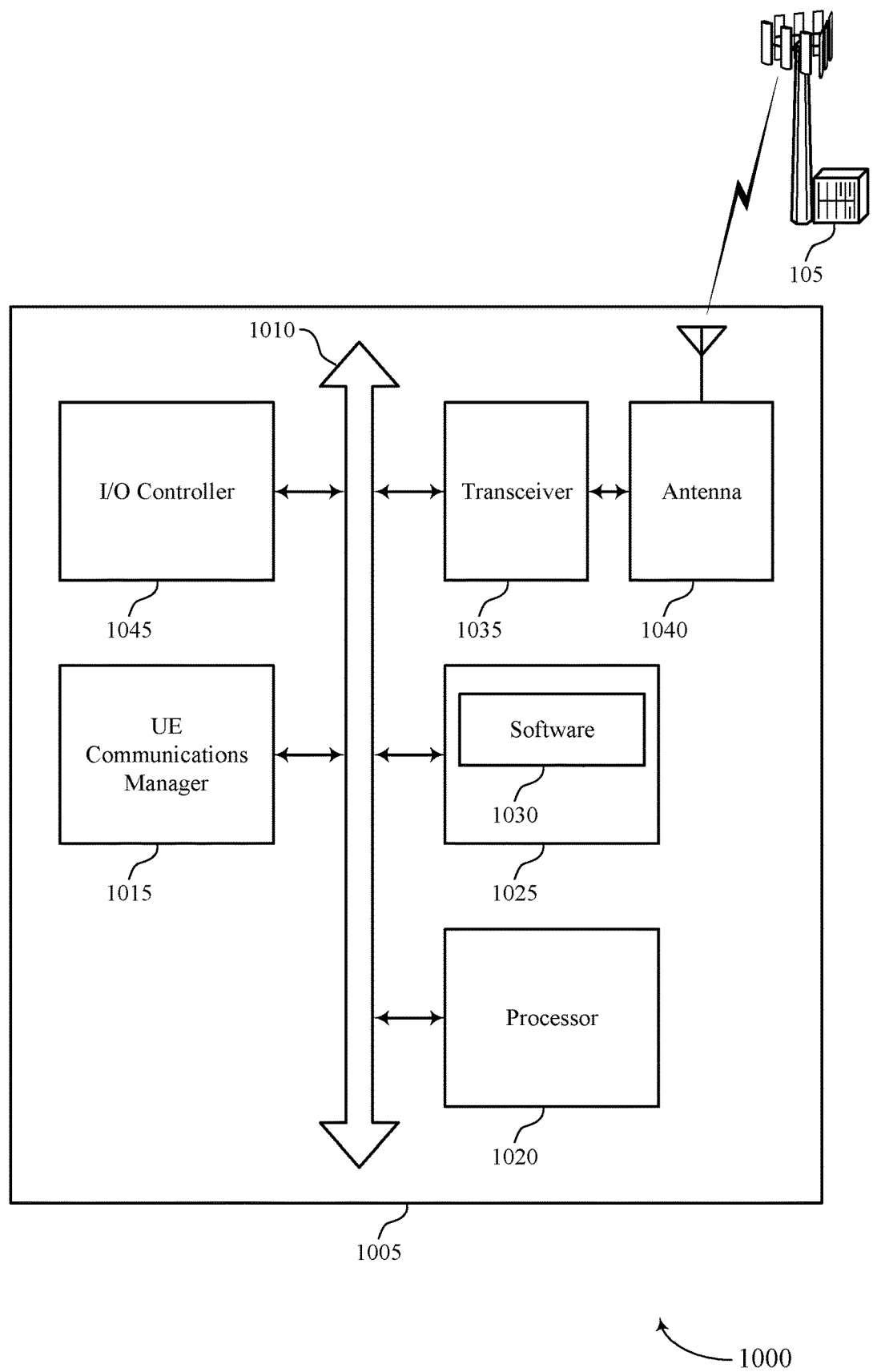
FIG. 10 illustrates a block diagram of a system including a UE that supports forward compatible design for non-orthogonal UE signature sequences in accordance with aspects of the present disclosure.

FIG. 10 shows a diagram of a system 1000 including a device 1005 that supports forward compatible design for non-orthogonal UE signature sequences in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting forward compatible design for UE signature sequences in NOMA).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support forward compatible design for UE signature sequences in NOMA. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
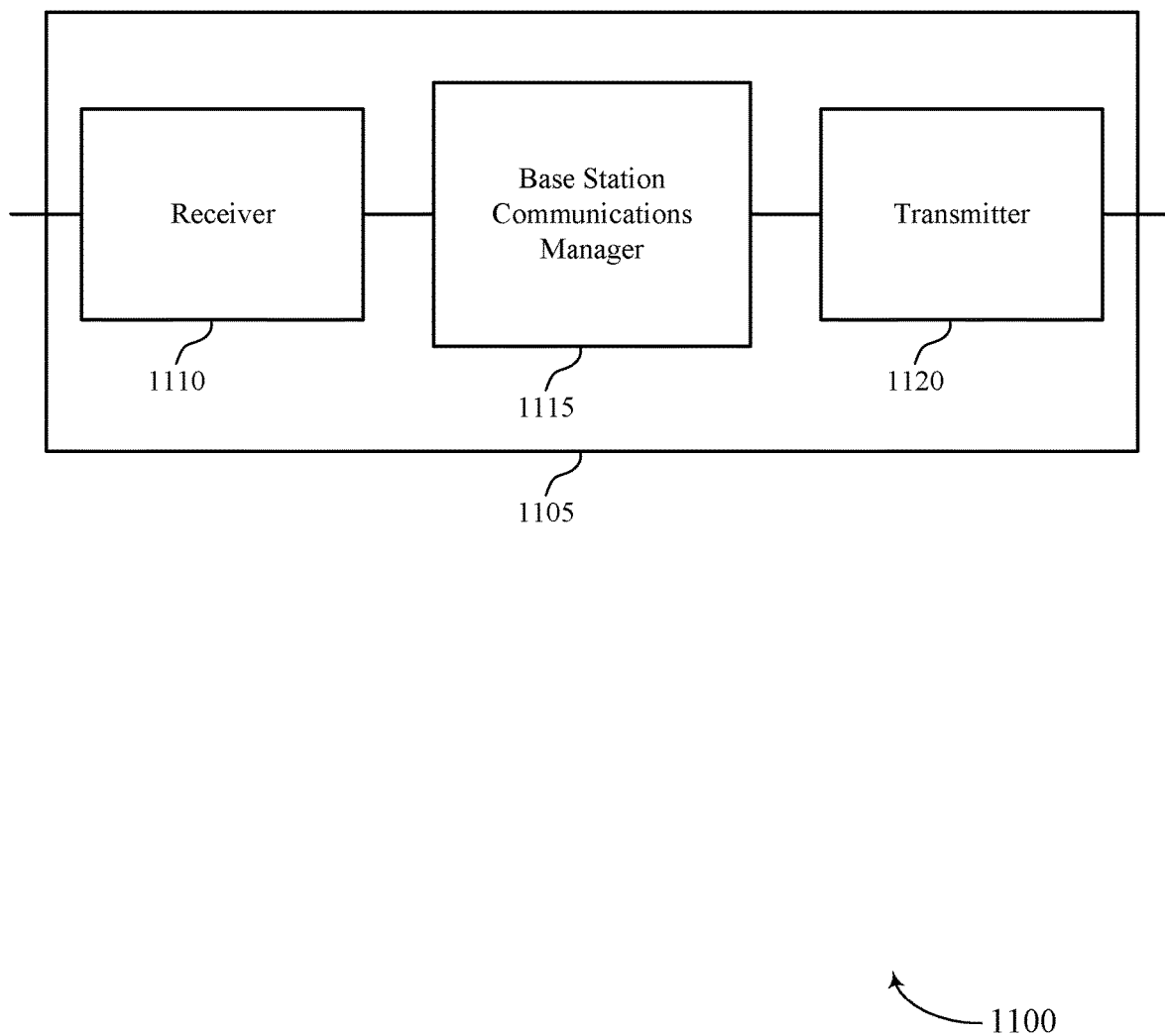
FIGS. 11 through 13 show block diagrams of a device that supports forward compatible design for non-orthogonal UE signature sequences in accordance with aspects of the present disclosure.

FIG. 11 shows a block diagram 1100 of a wireless device 1105 that supports forward compatible design for non-orthogonal UE signature sequences in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to forward compatible design for UE signature sequences in NOMA, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may receive, from a core network, a first number of UEs for supporting for communication with the base station and a sequence length of UE specific signature sequences for communicating with the UEs equal to a second number, where the second number is less than the first number, identify a codebook matrix having a number of rows equal to the first number and a number of columns equal to the second number, where the rows of the codebook matrix include a Welch bound equality achieving vector set, and where the rows of the codebook matrix correspond to a first set of UE specific signature sequences having the sequence length, and communicate with one or more UEs based on the first set of UE specific signature sequences.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
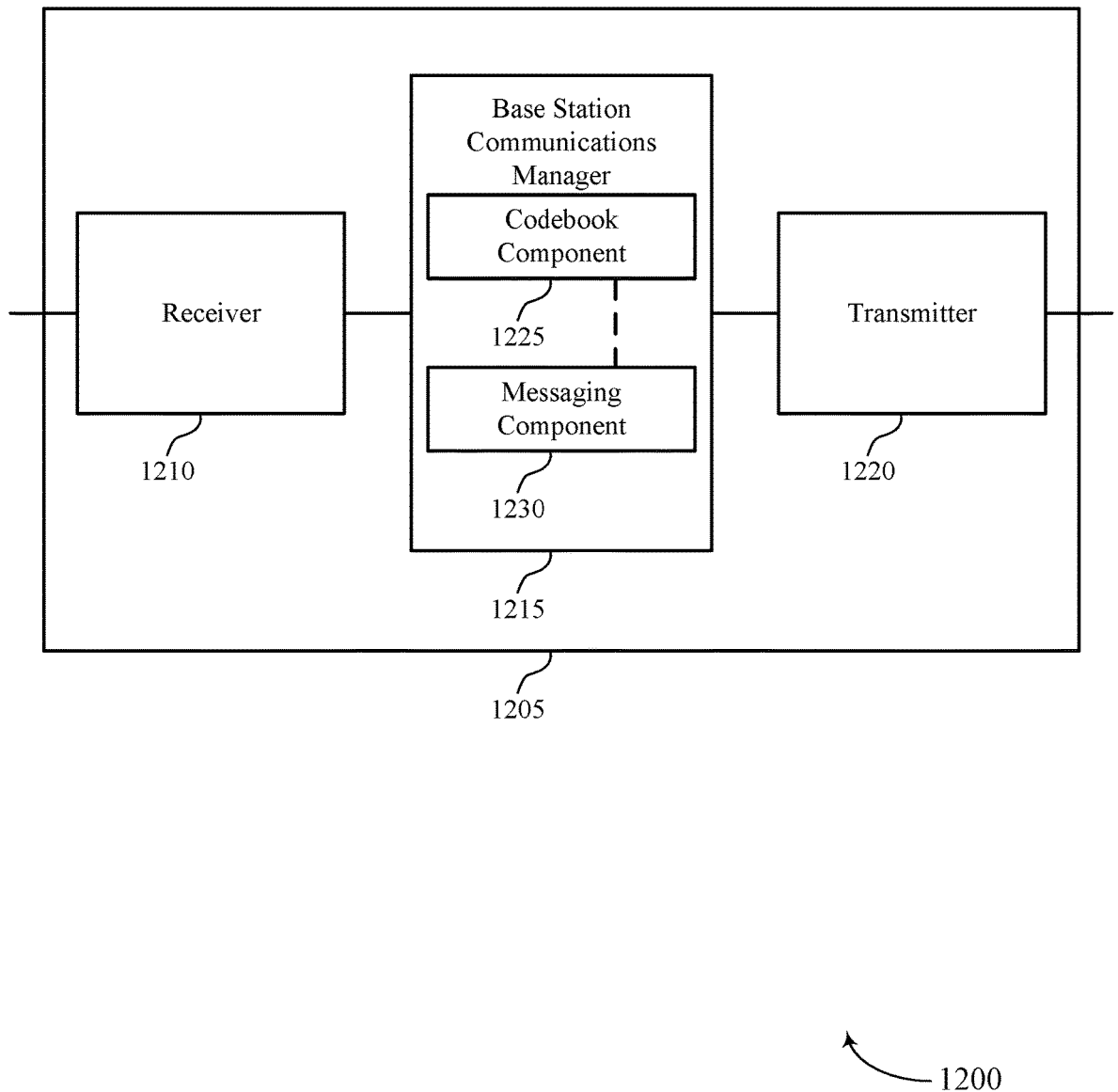

FIG. 12 shows a block diagram 1200 of a wireless device 1205 that supports forward compatible design for non-orthogonal UE signature sequences in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to forward compatible design for UE signature sequences in NOMA, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14.

Base station communications manager 1215 may also include codebook component 1225 and messaging component 1230.

Codebook component 1225 may receive, from a core network, a first number of UEs for supporting for communication with the base station and a sequence length of UE specific signature sequences for communicating with the UEs equal to a second number, where the second number is less than the first number, identify a codebook matrix having a number of rows equal to the first number and a number of columns equal to the second number, where the rows of the codebook matrix include a Welch bound equality achieving vector set, and where the rows of the codebook matrix correspond to a first set of UE specific signature sequences having the sequence length, identify, at the base station, a number of additional UEs equal to a third number for supporting for communication with the base station, generate a delta matrix including a number of rows equal to the third number and a number of columns equal to the second number, where rows of the augmented codebook matrix include a Welch bound equality achieving vector set, and generate the one or more column vectors according to an orthonormalising function.

In some cases, identifying the codebook matrix includes: generating a first orthogonal matrix including a number of rows equal to the first number and a number of columns equal to the first number. In some cases, the first orthogonal matrix is a discrete Fourier transform matrix. In some cases, the first orthogonal matrix includes a set of cyclically shifted Zadoff-Chu sequences. In some cases, identifying the codebook matrix includes: generating the codebook matrix based on a chirp sequence function over the first number and the second number.

Messaging component 1230 may communicate with one or more UEs based on the first set of UE specific signature sequences, communicate with at least one UE based on the augmented codebook matrix, and communicate with the one or more UEs based on the second set of UE specific signature sequences.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
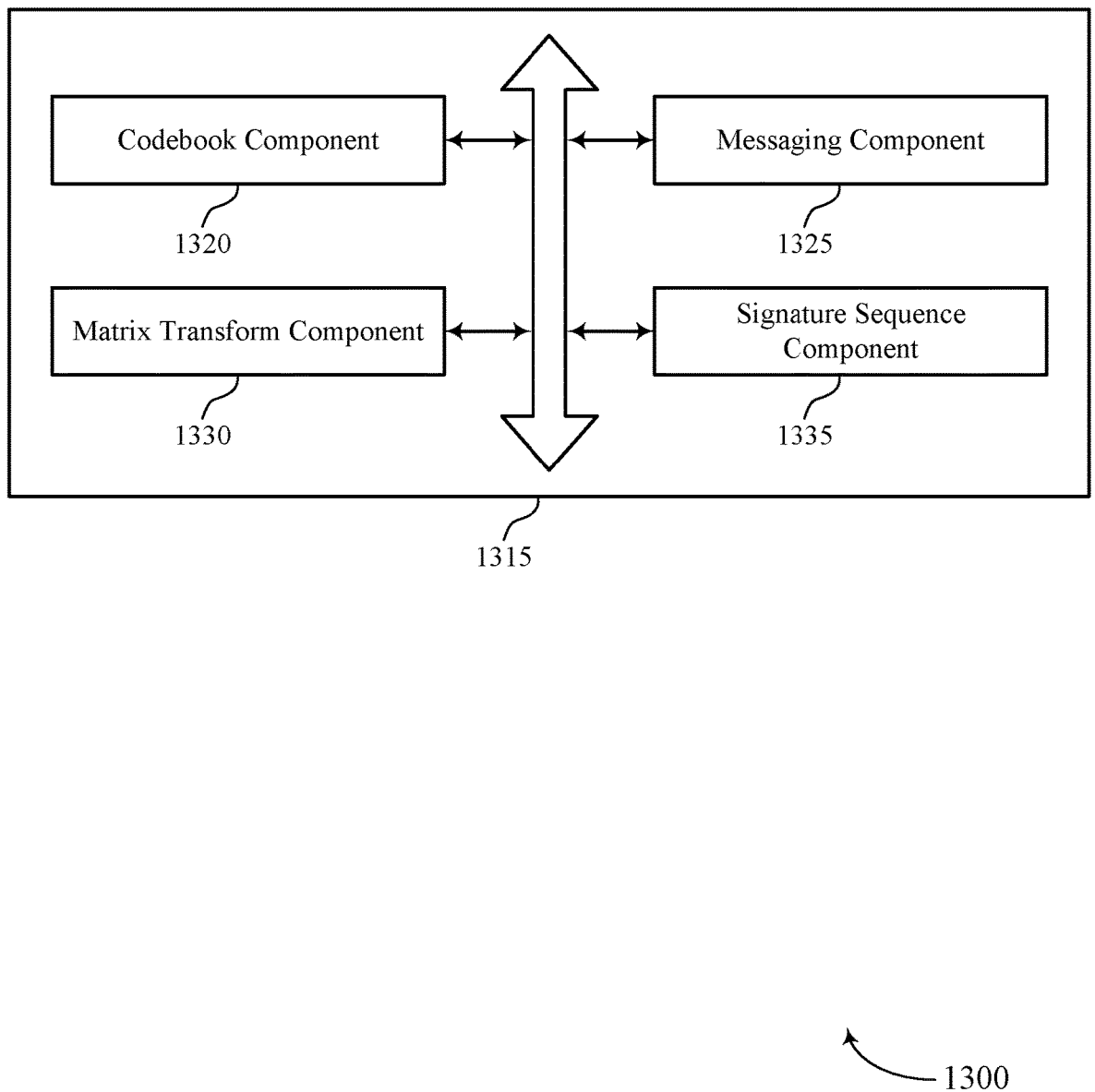

FIG. 13 shows a block diagram 1300 of a base station communications manager 1315 that supports forward compatible design for non-orthogonal UE signature sequences in accordance with aspects of the present disclosure. The base station communications manager 1315 may be an example of aspects of a base station communications manager 1415 described with reference to FIGS. 11, 12, and 14. The base station communications manager 1315 may include codebook component 1320, messaging component 1325, matrix transform component 1330, and signature sequence component 1335. Each of these modules may communicate, directly or indirectly, with one another (e.g., via one or more buses).

Codebook component 1320 may receive, from a core network, a first number of UEs for supporting for communication with the base station and a sequence length of UE specific signature sequences for communicating with the UEs equal to a second number, where the second number is less than the first number, identify a codebook matrix having a number of rows equal to the first number and a number of columns equal to the second number, where the rows of the codebook matrix include a Welch bound equality achieving vector set, and where the rows of the codebook matrix correspond to a first set of UE specific signature sequences having the sequence length, identify, at the base station, a number of additional UEs equal to a third number for supporting for communication with the base station, generate a delta matrix including a number of rows equal to the third number and a number of columns equal to the second number, where rows of the augmented codebook matrix include a Welch bound equality achieving vector set, and generate the one or more column vectors according to an orthonormalising function.

In some cases, identifying the codebook matrix includes: generating a first orthogonal matrix including a number of rows equal to the first number and a number of columns equal to the first number. In some cases, the first orthogonal matrix is a discrete Fourier transform matrix. In some cases, the first orthogonal matrix includes a set of cyclically shifted Zadoff-Chu sequences. In some cases, identifying the codebook matrix includes: generating the codebook matrix based on a chirp sequence function over the first number and the second number.

Messaging component 1325 may communicate with one or more UEs based on the first set of UE specific signature sequences, communicate with at least one UE based on the augmented codebook matrix, and communicate with the one or more UEs based on the second set of UE specific signature sequences.

Matrix transform component 1330 may remove a number of columns equal to a third number from the first orthogonal matrix to generate the codebook matrix, generate an augmented codebook matrix by appending the delta matrix to the codebook matrix, add one or more column vectors having lengths of the first number to the codebook matrix to obtain a second codebook matrix, where rows of the second codebook matrix include a second set of UE specific signature sequences, or remove one or more orthogonal column vectors of length the first number from the codebook matrix to obtain a second codebook matrix, where rows of the second codebook matrix include a second set of UE specific signature sequences.

Signature sequence component 1335 may broadcast an indicator of activation of a supplementary set of UE specific signature sequences from the delta matrix, broadcast an indicator of a change in the sequence length from the second number to a third number, allocate a first UE specific signature sequence from the first set of rows of the codebook matrix to a first UE based on a first quality of service (QoS) associated with the first UE, and allocate a second UE specific signature sequence from the second set of rows of the codebook matrix to a second UE based on a second QoS associated with the second UE.

Figure 14:
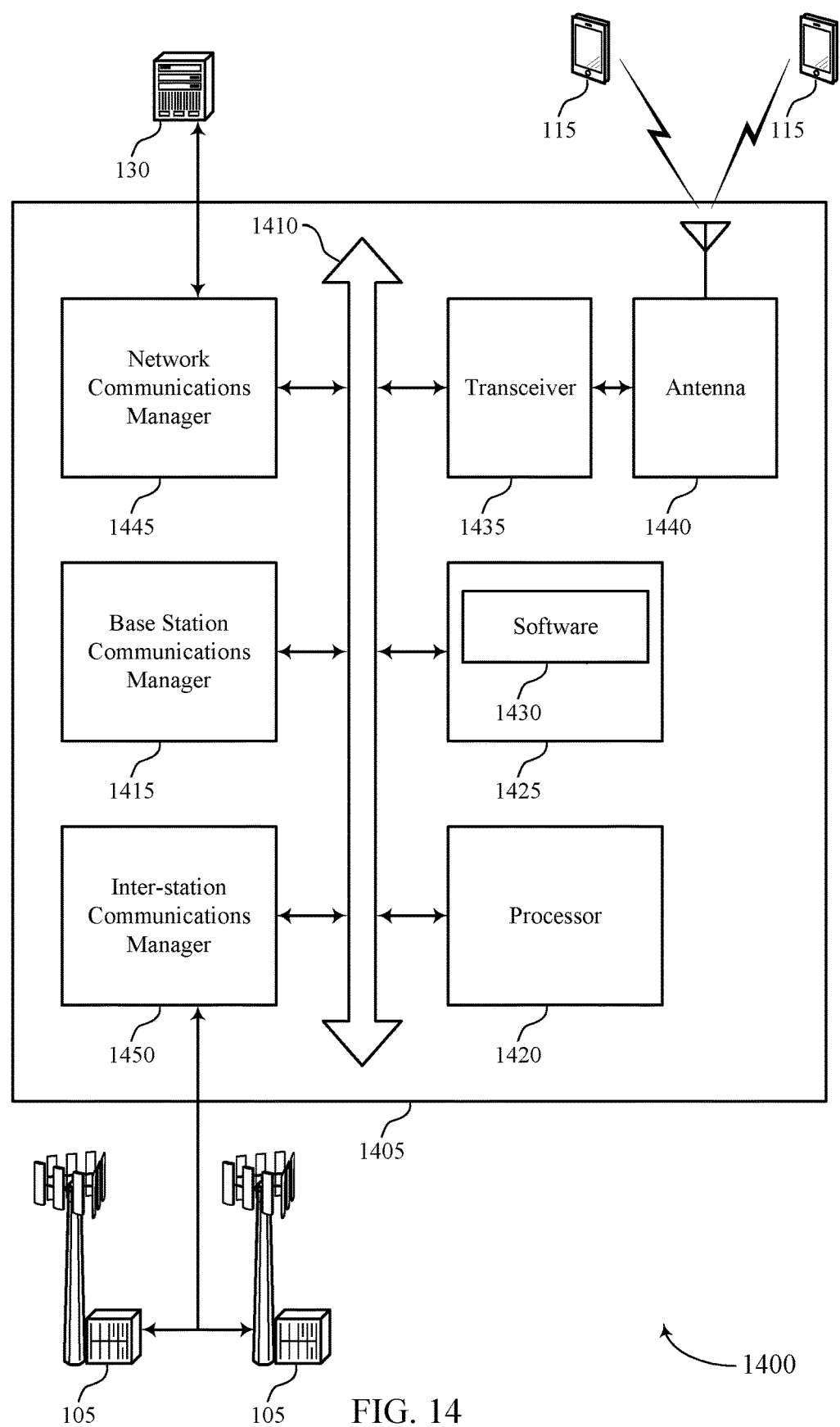
FIG. 14 illustrates a block diagram of a system including a base station that supports forward compatible design for non-orthogonal UE signature sequences in accordance with aspects of the present disclosure.

FIG. 14 shows a diagram of a system 1400 including a device 1405 that supports forward compatible design for non-orthogonal UE signature sequences in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting forward compatible design for UE signature sequences in NOMA).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support forward compatible design for UE signature sequences in NOMA. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
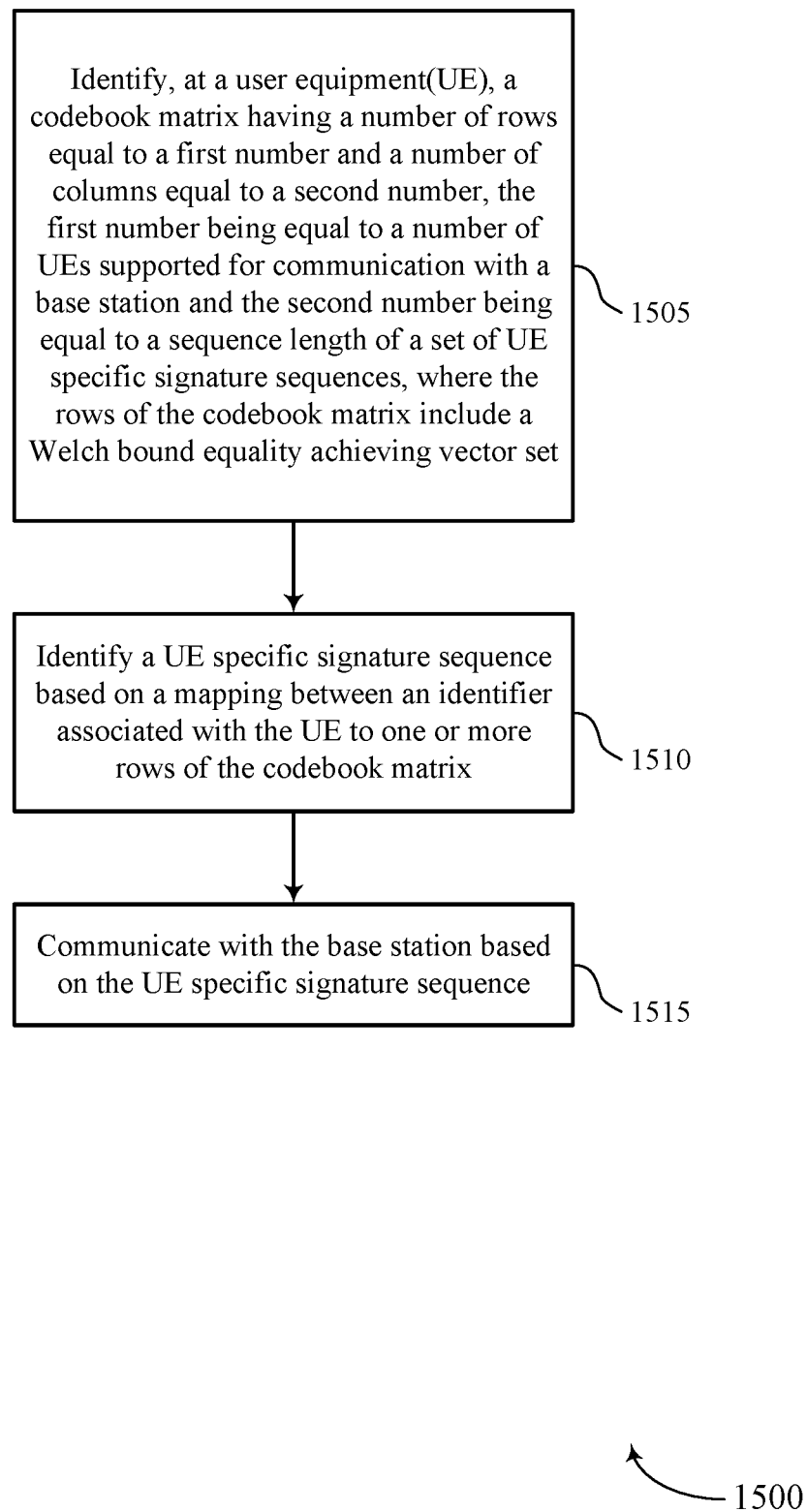
FIGS. 15 through 16 illustrate methods for forward compatible design for non-orthogonal UE signature sequences in accordance with aspects of the present disclosure.

FIG. 15 shows a flowchart illustrating a method 1500 for forward compatible design for non-orthogonal UE signature sequences in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may identify a codebook matrix having a number of rows equal to a first number and a number of columns equal to a second number, the first number being equal to a number of user UEs supported for communication with a base station and the second number being equal to a sequence length of a set of UE specific signature sequences, wherein the rows of the codebook matrix comprise a Welch bound equality achieving vector set. The operations of 1505 may be performed according to the methods described herein. In certain examples, aspects of the operations of 1505 may be performed by a codebook component as described with reference to FIGS. 7 through 10.

At 1510, the UE 115 may identify a UE specific signature sequence based at least in part on a mapping between an identifier associated with the UE to one or more rows of the codebook matrix. The operations of 1510 may be performed according to the methods described herein. In certain examples, aspects of the operations of 1510 may be performed by a signature sequence component as described with reference to FIGS. 7 through 10.

At 1515, the UE 115 may communicate with the base station based at least in part on the UE specific signature sequence. The operations of 1515 may be performed according to the methods described herein. In certain examples, aspects of the operations of 1515 may be performed by a messaging component as described with reference to FIGS. 7 through 10.

Figure 16:
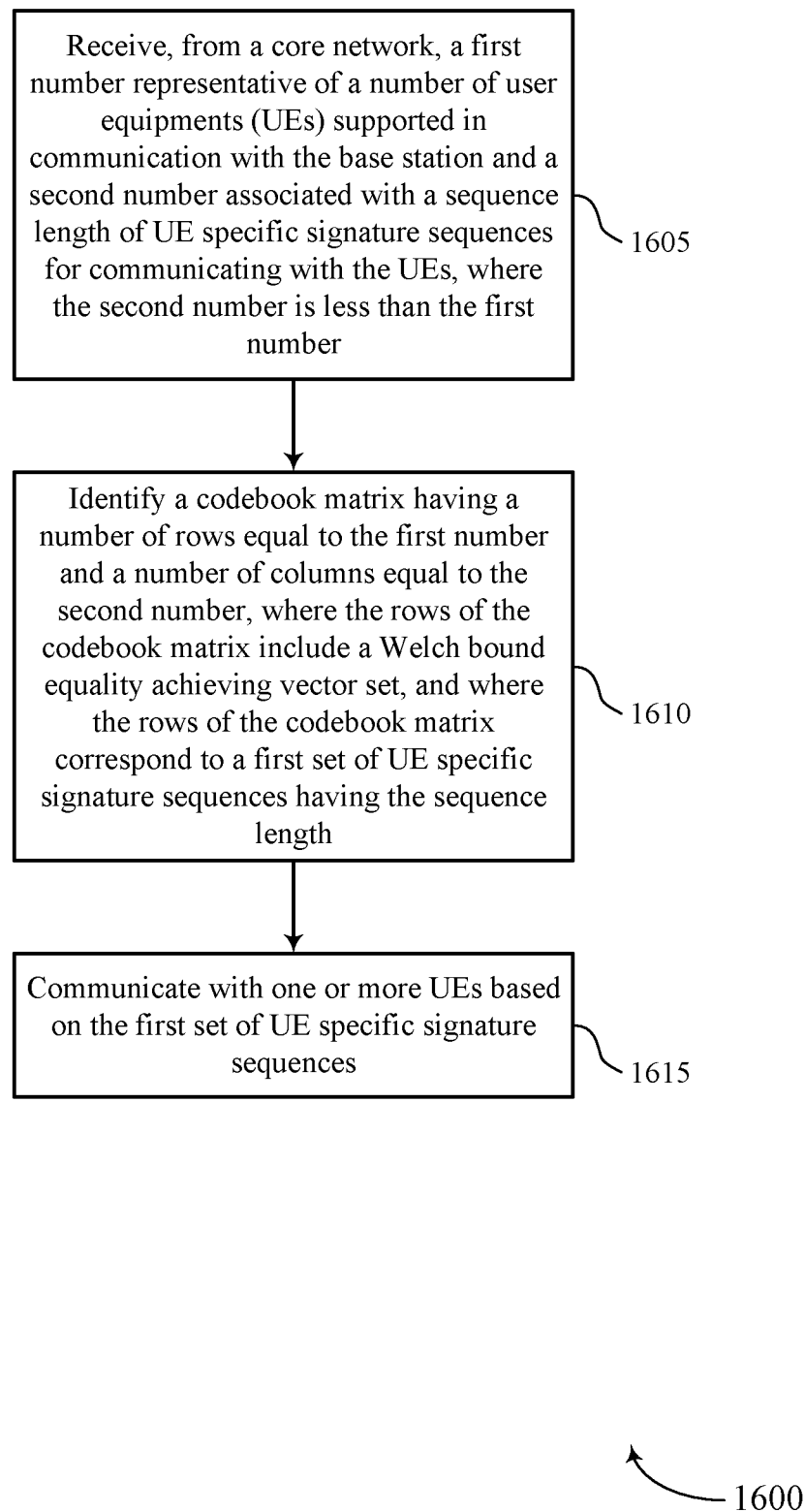

FIG. 16 shows a flowchart illustrating a method 1600 for forward compatible design for non-orthogonal UE signature sequences in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605, the base station 105 may receive, from a core network, a first number representative of a number of UEs supported in communication with the base station and a second number associated with a sequence length of UE specific signature sequences for communicating with the UEs, wherein the second number is less than the first number. The operations of 1605 may be performed according to the methods described herein. In certain examples, aspects of the operations of 1605 may be performed by a codebook component as described with reference to FIGS. 11 through 14.

At 1610, the base station 105 may identify a codebook matrix having a number of rows equal to the first number and a number of columns equal to the second number, wherein the rows of the codebook matrix comprise a Welch bound equality achieving vector set, and wherein the rows of the codebook matrix correspond to a first set of UE specific signature sequences having the sequence length. The operations of 1610 may be performed according to the methods described herein. In certain examples, aspects of the operations of 1610 may be performed by a codebook component as described with reference to FIGS. 11 through 14.

At 1615, the base station 105 may communicate with one or more UEs based at least in part on the first set of UE specific signature sequences. The operations of 1615 may be performed according to the methods described herein. In certain examples, aspects of the operations of 1615 may be performed by a messaging component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, at a user equipment (UE), a codebook matrix having a number of rows equal to a first number and a number of columns equal to a second number, the first number being equal to a number of user equipments (UEs) supported for communication with a base station and the second number being equal to a sequence length of a set of UE specific signature sequences, wherein rows of the codebook matrix comprise a Welch bound equality achieving vector set;
   identifying a UE specific signature sequence based at least in part on a mapping between an identifier associated with the UE to one or more rows of the codebook matrix; and
   communicating with the base station based at least in part on the UE specific signature sequence.

2. The method of claim 1, wherein identifying the codebook matrix comprises:
generating a first orthogonal matrix comprising a number of rows equal to the first number and a number of columns equal to the first number; and;
removing a number of columns equal to a third number from the first orthogonal matrix to generate the codebook matrix.

3. The method of claim 2, wherein the first orthogonal matrix is a discrete Fourier transform matrix.

4. The method of claim 2, wherein the first orthogonal matrix comprises a plurality of cyclically shifted Zadoff-Chu sequences.

5. The method of claim 1, wherein identifying the codebook matrix comprises:
generating the codebook matrix based at least in part on a chirp sequence function over the first number and the second number.

6. The method of claim 1, further comprising:
receiving, from the base station, an indicator of activation of a supplementary set of UE specific signature sequences having a number of sequences equal to a third number.

7. The method of claim 6, wherein identifying the codebook matrix comprises:
identifying a delta matrix comprising a number of rows equal to the third number and a number of columns equal to the second number, wherein the identifying the UE specific signature sequence is based at least in part on a mapping between the identifier associated with the UE and one or more rows of the delta matrix.

8. The method of claim 1, further comprising:
receiving, from the base station, an indicator of a change in the sequence length from the second number to a third number;
adding one or more column vectors having lengths of the first number to the codebook matrix to obtain a second codebook matrix, wherein rows of the second codebook matrix comprise a second set of UE specific signature sequences;
identifying a second UE specific signature sequence based at least in part on a mapping between the identifier associated with the UE to one or more rows of the second codebook matrix; and
communicating with the base station based at least in part on the second UE specific signature sequence.

9. The method of claim 8, further comprising:
generating the one or more column vectors according to an orthogonalizing function.

10. The method of claim 1, further comprising:
receiving, from the base station, an indicator of a change in the sequence length from the second number to a third number;
removing one or more orthogonal column vectors of length the first number from the codebook matrix to obtain a second codebook matrix, wherein rows of the second codebook matrix comprise a second set of UE specific signature sequences;
identifying a second UE specific signature sequence based at least in part on a mapping between the identifier associated with the UE to one or more rows of the second codebook matrix; and
communicating with the base station based at least in part on the second UE specific signature sequence.

11. The method of claim 1, wherein the communicating with the base station comprises:
applying the UE specific signature sequence to an uplink signal, the uplink signal comprising a reference signal, a control signal, a data signal, or a combination thereof; and
transmitting the uplink signal to the base station.

12. The method of claim 1, wherein the communicating with the base station comprises:
receiving a downlink signal from the base station; and
applying the UE specific signature sequence to the downlink signal to obtain a reference signal, a control signal, a data signal, or a combination thereof.

13. A method for wireless communication, comprising:
receiving, at a base station from a core network, a first number representative of a number of user equipments (UEs) supported in communication with the base station and a second number associated with a sequence length of UE specific signature sequences for communicating with the UEs, wherein the second number is less than the first number;
identifying a codebook matrix having a number of rows equal to the first number and a number of columns equal to the second number, wherein rows of the codebook matrix comprise a Welch bound equality achieving vector set, and wherein the rows of the codebook matrix correspond to a first set of UE specific signature sequences having the sequence length; and
communicating with one or more UEs based at least in part on the first set of UE specific signature sequences.

14. The method of claim 13, wherein identifying the codebook matrix comprises:
generating a first orthogonal matrix comprising a number of rows equal to the first number and a number of columns equal to the first number; and
removing a number of columns equal to a third number from the first orthogonal matrix to generate the codebook matrix.

15. The method of claim 14, wherein the first orthogonal matrix is a discrete Fourier transform matrix.

16. The method of claim 14, wherein the first orthogonal matrix comprises a plurality of cyclically shifted Zadoff-Chu sequences.

17. The method of claim 13, wherein identifying the codebook matrix comprises:
generating the codebook matrix based at least in part on a chirp sequence function over the first number and the second number.

18. The method of claim 13, further comprising:
identifying, at the base station, a number of additional UEs equal to a third number for supporting for communication with the base station.

19. The method of claim 18, further comprising:
generating a delta matrix comprising a number of rows equal to the third number and a number of columns equal to the second number;
generating an augmented codebook matrix by appending the delta matrix to the codebook matrix; and
communicating with at least one UE based at least in part on the augmented codebook matrix.

20. The method of claim 19, wherein rows of the augmented codebook matrix comprise a Welch bound equality achieving vector set.

21. The method of claim 19, further comprising:
broadcasting an indicator of activation of a supplementary set of UE specific signature sequences from the delta matrix.

22. The method of claim 13, further comprising:
adding one or more column vectors having lengths of the first number to the codebook matrix to obtain a second codebook matrix, wherein rows of the second codebook matrix comprise a second set of UE specific signature sequences; and
communicating with the one or more UEs based at least in part on the second set of UE specific signature sequences.

23. The method of claim 22, further comprising:
generating the one or more column vectors according to an orthogonalizing function.

24. The method of claim 13, further comprising:
removing one or more orthogonal column vectors of length the first number from the codebook matrix to obtain a second codebook matrix, wherein rows of the second codebook matrix comprise a second set of UE specific signature sequences; and
communicating with the one or more UEs based at least in part on the second set of UE specific signature sequences.

25. The method of claim 13, further comprising:
broadcasting an indicator of a change in the sequence length from the second number to a third number.

26. The method of claim 13, further comprising:
allocating a first UE specific signature sequence from a first set of rows of the codebook matrix to a first UE based at least in part on a first quality of service (QoS) associated with the first UE; and
allocating a second UE specific signature sequence from a second set of rows of the codebook matrix to a second UE based at least in part on a second QoS associated with the second UE.

27. An apparatus for wireless communication, comprising:
a processor;
memory in electronic communication with the processor; and
instructions stored in the memory and executable by the processor to cause the apparatus to:
identify, at a user equipment (UE), a codebook matrix having a number of rows equal to a first number and a number of columns equal to a second number, the first number being equal to a number of user equipments (UEs) supported for communication with a base station and the second number being equal to a sequence length of a set of UE specific signature sequences, wherein the rows of the codebook matrix comprise a Welch bound equality achieving vector set;
identify a UE specific signature sequence based at least in part on a mapping between an identifier associated with the UE to one or more rows of the codebook matrix; and
communicate with the base station based at least in part on the UE specific signature sequence.

28. The apparatus of claim 27, wherein the instructions are further executable by the processor to cause the apparatus to:
receive, from the base station, an indicator of activation of a supplementary set of UE specific signature sequences having a number of sequences equal to a third number,
wherein the instructions executable by the processor to identify the codebook matrix comprise instructions executable by the processor to cause the apparatus to:
identify a delta matrix comprising a number of sequences equal to the third number and a number of columns equal to the second number, wherein identifying the UE specific signature sequence is based at least in part on a mapping between the identifier associated with the UE and one or more rows of the delta matrix.

29. An apparatus for wireless communication, comprising:
a processor;
memory in electronic communication with the processor; and
instructions stored in the memory and executable by the processor to cause the apparatus to:
receive, at a base station from a core network, a first number representative of a number of user equipments (UEs) supported in communication with the base station and a second number associated with a sequence length of UE specific signature sequences for communicating with the UEs, wherein the second number is less than the first number;
identify a codebook matrix having a number of rows equal to the first number and a number of columns equal to the second number, wherein the rows of the codebook matrix comprise a Welch bound equality achieving vector set, and wherein the rows of the codebook matrix correspond to a first set of UE specific signature sequences having the sequence length; and
communicate with one or more UEs based at least in part on the first set of UE specific signature sequences.

30. The apparatus of claim 29, wherein the instructions are further executable by the processor to cause the apparatus to:
identify, at the base station, a number of additional UEs equal to a third number for supporting for communication with the base station;
generate a delta matrix comprising a number of rows equal to the third number and a number of columns equal to the second number;
generate an augmented codebook matrix by appending the delta matrix to the codebook matrix;
broadcast an indicator of activation of a supplementary set of UE specific signature sequences from the delta matrix; and
communicate with at least one UE based at least in part on the augmented codebook matrix.

* * * * *